(12) United States Patent
Manolakos et al.

(10) Patent No.: US 11,936,419 B2
(45) Date of Patent: Mar. 19, 2024

(54) DETERMINATION OF CAPABILITY OF USER EQUIPMENT TO MEASURE A DOWNLINK POSITIONING REFERENCE SIGNAL ACROSS A PLURALITY OF FREQUENCY HOPS

(71) Applicant: QUALCOMM Incorporated, San Diego, CA (US)

(72) Inventors: Alexandros Manolakos, Escondido, CA (US); Weimin Duan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/404,684

(22) Filed: Aug. 17, 2021

(65) Prior Publication Data
US 2022/0109466 A1    Apr. 7, 2022

Related U.S. Application Data

(60) Provisional application No. 63/088,218, filed on Oct. 6, 2020.

(51) Int. Cl.
*H04B 1/7143* (2011.01)
*H04L 5/00* (2006.01)
(Continued)

(52) U.S. Cl.
CPC ......... *H04B 1/7143* (2013.01); *H04L 5/0048* (2013.01); *H04W 72/044* (2013.01); *H04W 72/21* (2023.01); *H04W 72/51* (2023.01)

(58) Field of Classification Search
CPC ..... H04B 1/713; H04B 1/7143; H04L 5/0016; H04L 5/0048; H04L 27/261; H04L 5/0012; H04L 5/0094; H04W 72/048
See application file for complete search history.

(56) References Cited

U.S. PATENT DOCUMENTS

2018/0139763 A1*  5/2018  Bitra ................ H04L 5/0032
2018/0217228 A1    8/2018  Edge et al.
(Continued)

OTHER PUBLICATIONS

International Search Report and Written Opinion—PCT/US2021/046526—ISA/EPO—dated Nov. 15, 2021.
(Continued)

*Primary Examiner* — Aristocratis Fotakis
(74) *Attorney, Agent, or Firm* — Muncy, Geissler, Olds & Lowe, P.C./Qualcomm

(57) ABSTRACT

In an aspect, a network component (e.g., BS, LMF, etc.) determines a capability of the UE perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth (e.g., without frequency hopping), and each of the plurality of frequency hops associated with a sub-band of the transmission bandwidth of the DL-PRS, and configures one or more parameters associated with positioning of the UE based at least in part on the capability. In some designs, the UE may send an indication of the capability to the network component to facilitate the determination, while in other designs the network component may determine the capability via another mechanism.

29 Claims, 20 Drawing Sheets

(51) Int. Cl.
  *H04W 72/04* (2023.01)
  *H04W 72/044* (2023.01)
  *H04W 72/21* (2023.01)
  *H04W 72/51* (2023.01)

(56) References Cited

U.S. PATENT DOCUMENTS

| | | | |
|---|---|---|---|
| 2019/0253282 A1* | 8/2019 | Hadaschik | H04W 64/003 |
| 2019/0297489 A1 | 9/2019 | Lei et al. | |
| 2020/0044687 A1* | 2/2020 | Wechsler | H04L 5/0012 |
| 2020/0169367 A1* | 5/2020 | Palanivelu | H04W 72/044 |
| 2020/0235877 A1 | 7/2020 | Manolakos et al. | |
| 2020/0259521 A1* | 8/2020 | Zhao | H04B 1/7136 |
| 2020/0336269 A1* | 10/2020 | Shen | H04L 5/0094 |
| 2021/0058936 A1* | 2/2021 | Gordaychik | H04W 72/0453 |
| 2022/0022158 A1* | 1/2022 | Zarifi | H04L 5/0048 |

OTHER PUBLICATIONS

Nokia., et al., "UE Capability Indication Enhancement for OTDOA Positioning in FeMTC", R1-1611491, 3GPP TSG RAN WG1 Meeting #87, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), 2 Pages, XP051175469, Retrieved from the Internet: URL: http://www.3gpp.org/ftp/Meetings_3GPP_SYNC/RAN1/Docs/, [retrieved on Nov. 13, 2016], Section 2.

* cited by examiner

DETERMINATION OF CAPABILITY OF USER EQUIPMENT TO MEASURE A DOWNLINK POSITIONING REFERENCE SIGNAL ACROSS A PLURALITY OF FREQUENCY HOPS

CROSS-REFERENCE TO RELATED APPLICATIONS

The present Application for Patent claims the benefit of U.S. Provisional Application No. 63/088,218, entitled "DETERMINATION OF CAPABILITY OF USER EQUIPMENT TO MEASURE A DOWNLINK POSITIONING REFERENCE SIGNAL ACROSS A PLURALITY OF FREQUENCY HOPS," filed Oct. 6, 2020, assigned to the assignee hereof, and expressly incorporated herein by reference in its entirety.

BACKGROUND OF THE DISCLOSURE

1. Field of the Disclosure

Aspects of the disclosure relate generally to wireless communications, and more particularly to a determination of a capability of a user equipment (UE) to measure a downlink positioning reference signal (DL-PRS) across a plurality of frequency hops.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes determining a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmitting an indication of the capability to a network component.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the indication indicates a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the indication indicates a minimum time gap between consecutive frequency hops.

In some aspects, the indication indicates that the UE can perform phase offset compensation with overlapped tones, or the indication indicates that the UE can perform phase offset compensation without overlapped tones, or wherein the indication indicates that the UE can perform time-offset compensation, or a combination thereof.

In some aspects, the indication is per-band or per-band combination.

In some aspects, the indication indicates a first number of resources that the UE can process per slot, or the indication indicates a second number of resources that the UE can process per measurement period, or a combination thereof.

In some aspects, the indication indicates a number of frequency hops that the UE can process over a particular time-domain window.

In some aspects, one or more accuracy requirements associated with phase-offset compensation, time-drift compensation, or both, are defined assuming a threshold amount of overlap between sub-bands of consecutive frequency hops for a particular time-domain window.

In some aspects, the method includes receiving a DL-PRS configuration that is based in part on the indication.

In some aspects, a measurement period associated with the DL-PRS configuration is based at least in part upon the indication, or the DL-PRS configuration is associated with one or more accuracy requirements that are based at least in part on the indication, or a combination thereof.

In some aspects, the indication indicates a number of the plurality of frequency hops that can be performed within a single DL-PRS instance of the DL-PRS.

In some aspects, the indication indicates a UE DL-PRS processing capability, or wherein one or more accuracy requirements associated with positioning of the UE are determined based in part upon the UE DL-PRS processing capability, or a combination thereof.

In some aspects, the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

In an aspect, a method of operating a network component includes determining a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configuring one or more parameters associated with positioning of the UE based at least in part on the capability.

In some aspects, the determination is based on an indication of the capability from the UE.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the capability comprises a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the capability comprises that the UE can perform phase offset compensation with overlapped tones, or the capability comprises that the UE can perform phase offset compensation without overlapped tones, or wherein the capability comprises that the UE can perform time-offset compensation, or a combination thereof.

In some aspects, the capability comprises a first number of resources that the UE can process per slot, or the capability comprises a second number of resources that the UE can process per measurement period, or a number of frequency hops that the UE can process over a particular time-domain window, or a combination thereof.

In some aspects, the one or more parameters comprise at least one parameter associated with a DL-PRS configuration, or the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

In some aspects, the method includes determining one or more accuracy requirements associated with positioning of the UE based in part upon the DL-PRS configuration.

In some aspects, the capability comprises a UE DL-PRS processing capability.

In some aspects, one or more accuracy requirements associated with phase-offset compensation, time-drift compensation, or both, are defined assuming a threshold amount of overlap between sub-bands of consecutive frequency hops for a particular time-domain window.

In an aspect, a user equipment (UE) includes a memory; at least one transceiver; and at least one processor communicatively coupled to the memory and the at least one transceiver, the at least one processor configured to: determine a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmit, via the at least one transceiver, an indication of the capability to a network component.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the indication indicates a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the indication indicates a minimum time gap between consecutive frequency hops.

In some aspects, the indication indicates that the UE can perform phase offset compensation with overlapped tones, or the indication indicates that the UE can perform phase offset compensation without overlapped tones, or wherein the indication indicates that the UE can perform time-offset compensation, or a combination thereof.

In some aspects, the indication is per-band or per-band combination.

In some aspects, the indication indicates a first number of resources that the UE can process per slot, or the indication indicates a second number of resources that the UE can process per measurement period, or a combination thereof.

In some aspects, the indication indicates a number of frequency hops that the UE can process over a particular time-domain window.

In some aspects, one or more accuracy requirements associated with phase-offset compensation, time-drift compensation, or both, are defined assuming a threshold amount of overlap between sub-bands of consecutive frequency hops for a particular time-domain window.

In some aspects, the at least one processor is further configured to: receive, via the at least one transceiver, a DL-PRS configuration that is based in part on the indication.

In some aspects, a measurement period associated with the DL-PRS configuration is based at least in part upon the indication, or the DL-PRS configuration is associated with one or more accuracy requirements that are based at least in part on the indication, or a combination thereof.

In some aspects, the indication indicates a number of the plurality of frequency hops that can be performed within a single DL-PRS instance of the DL-PRS.

In some aspects, the indication indicates a UE DL-PRS processing capability, or wherein one or more accuracy requirements associated with positioning of the UE are determined based in part upon the UE DL-PRS processing capability, or a combination thereof.

In some aspects, the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

In an aspect, a network component includes a memory; at least one transceiver; and at least one processor communicatively coupled to the memory and the at least one transceiver, the at least one processor configured to: determine a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configure one or more parameters associated with positioning of the UE based at least in part on the capability.

In some aspects, the determination is based on an indication of the capability from the UE.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the capability comprises a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the capability comprises that the UE can perform phase offset compensation with overlapped tones, or the capability comprises that the UE can perform phase offset compensation without overlapped tones, or wherein the capability comprises that the UE can perform time-offset compensation, or a combination thereof.

In some aspects, the capability comprises a first number of resources that the UE can process per slot, or the capability comprises a second number of resources that the UE can process per measurement period, or a number of frequency hops that the UE can process over a particular time-domain window, or a combination thereof.

In some aspects, the one or more parameters comprise at least one parameter associated with a DL-PRS configuration, or the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

In some aspects, the at least one processor is further configured to: determine one or more accuracy requirements associated with positioning of the UE based in part upon the DL-PRS configuration.

In some aspects, the capability comprises a UE DL-PRS processing capability.

In some aspects, one or more accuracy requirements associated with phase-offset compensation, time-drift compensation, or both, are defined assuming a threshold amount of overlap between sub-bands of consecutive frequency hops for a particular time-domain window.

In an aspect, a user equipment (UE) includes means for determining a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and means for transmitting an indication of the capability to a network component.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the indication indicates a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the indication indicates a minimum time gap between consecutive frequency hops.

In some aspects, the indication indicates that the UE can perform phase offset compensation with overlapped tones, or the indication indicates that the UE can perform phase offset compensation without overlapped tones, or wherein the indication indicates that the UE can perform time-offset compensation, or a combination thereof.

In some aspects, the indication is per-band or per-band combination.

In some aspects, the indication indicates a first number of resources that the UE can process per slot, or the indication indicates a second number of resources that the UE can process per measurement period, or a combination thereof.

In some aspects, the indication indicates a number of frequency hops that the UE can process over a particular time-domain window.

In some aspects, one or more accuracy requirements associated with phase-offset compensation, time-drift compensation, or both, are defined assuming a threshold amount of overlap between sub-bands of consecutive frequency hops for a particular time-domain window.

In some aspects, the method includes means for receiving a DL-PRS configuration that is based in part on the indication.

In some aspects, a measurement period associated with the DL-PRS configuration is based at least in part upon the indication, or the DL-PRS configuration is associated with one or more accuracy requirements that are based at least in part on the indication, or a combination thereof.

In some aspects, the indication indicates a number of the plurality of frequency hops that can be performed within a single DL-PRS instance of the DL-PRS.

In some aspects, the indication indicates a UE DL-PRS processing capability. or wherein one or more accuracy requirements associated with positioning of the UE are determined based in part upon the UE DL-PRS processing capability, or a combination thereof.

In some aspects, the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

In an aspect, a network component includes means for determining a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and means for configuring one or more parameters associated with positioning of the UE based at least in part on the capability.

In some aspects, the determination is based on an indication of the capability from the UE.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the capability comprises a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the capability comprises that the UE can perform phase offset compensation with overlapped tones, or the capability comprises that the UE can perform phase offset compensation without overlapped tones, or wherein the capability comprises that the UE can perform time-offset compensation, or a combination thereof.

In some aspects, the capability comprises a first number of resources that the UE can process per slot, or the capability comprises a second number of resources that the UE can process per measurement period, or a number of frequency hops that the UE can process over a particular time-domain window, or a combination thereof.

In some aspects, the one or more parameters comprise at least one parameter associated with a DL-PRS configuration, or the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

In some aspects, the method includes means for determining one or more accuracy requirements associated with positioning of the UE based in part upon the DL-PRS configuration.

In some aspects, the capability comprises a UE DL-PRS processing capability.

In some aspects, one or more accuracy requirements associated with phase-offset compensation, time-drift compensation, or both, are defined assuming a threshold amount of overlap between sub-bands of consecutive frequency hops for a particular time-domain window.

In an aspect, a non-transitory computer-readable medium storing computer-executable instructions that, when executed by a user equipment (UE), cause the UE to: determine a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmit an indication of the capability to a network component.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the indication indicates a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the indication indicates a minimum time gap between consecutive frequency hops.

In some aspects, the indication indicates that the UE can perform phase offset compensation with overlapped tones, or the indication indicates that the UE can perform phase offset compensation without overlapped tones, or wherein the indication indicates that the UE can perform time-offset compensation, or a combination thereof.

In some aspects, the indication is per-band or per-band combination.

In some aspects, the indication indicates a first number of resources that the UE can process per slot, or the indication indicates a second number of resources that the UE can process per measurement period, or a combination thereof.

In some aspects, the indication indicates a number of frequency hops that the UE can process over a particular time-domain window.

In some aspects, one or more accuracy requirements associated with phase-offset compensation, time-drift compensation, or both, are defined assuming a threshold amount of overlap between sub-bands of consecutive frequency hops for a particular time-domain window.

In some aspects, instructions that, when executed by UE, further cause the UE to:

In some aspects, a measurement period associated with the DL-PRS configuration is based at least in part upon the indication, or the DL-PRS configuration is associated with one or more accuracy requirements that are based at least in part on the indication, or a combination thereof.

In some aspects, the indication indicates a number of the plurality of frequency hops that can be performed within a single DL-PRS instance of the DL-PRS.

In some aspects, the indication indicates a UE DL-PRS processing capability, or wherein one or more accuracy requirements associated with positioning of the UE are determined based in part upon the UE DL-PRS processing capability, or a combination thereof.

In some aspects, the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

In an aspect, a non-transitory computer-readable medium storing computer-executable instructions that, when executed by a network component, cause the network component to: determine a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configure one or more parameters associated with positioning of the UE based at least in part on the capability.

In some aspects, the determination is based on an indication of the capability from the UE.

In some aspects, the transmission bandwidth of the DL-PRS comprises at least each sub-band associated with the plurality of frequency hops, and each of the plurality of frequency hops is associated with measurement by the UE of the respective sub-band at a different time.

In some aspects, the DL-PRS is transmitted on the plurality of OFDM symbols on the same transmission bandwidth without frequency hopping.

In some aspects, the capability comprises a minimum sub-band overlap between two frequency hops.

In some aspects, the minimum sub-band overlap is specified as a number of physical resource blocks (PRBs), or the minimum sub-band overlap is specified as a percentage of a sub-band size associated with the plurality of frequency hops.

In some aspects, the capability comprises that the UE can perform phase offset compensation with overlapped tones, or the capability comprises that the UE can perform phase offset compensation without overlapped tones, or wherein the capability comprises that the UE can perform time-offset compensation, or a combination thereof.

In some aspects, the capability comprises a first number of resources that the UE can process per slot, or the capability comprises a second number of resources that the UE can process per measurement period, or a number of frequency hops that the UE can process over a particular time-domain window, or a combination thereof.

In some aspects, the one or more parameters comprise at least one parameter associated with a DL-PRS configuration, or the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

In some aspects, instructions that, when executed by network component, further cause the network component to:

In some aspects, the capability comprises a UE DL-PRS processing capability.

In some aspects, one or more accuracy requirements associated with phase-offset compensation, time-drift compensation, or both, are defined assuming a threshold amount of overlap between sub-bands of consecutive frequency hops for a particular time-domain window.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
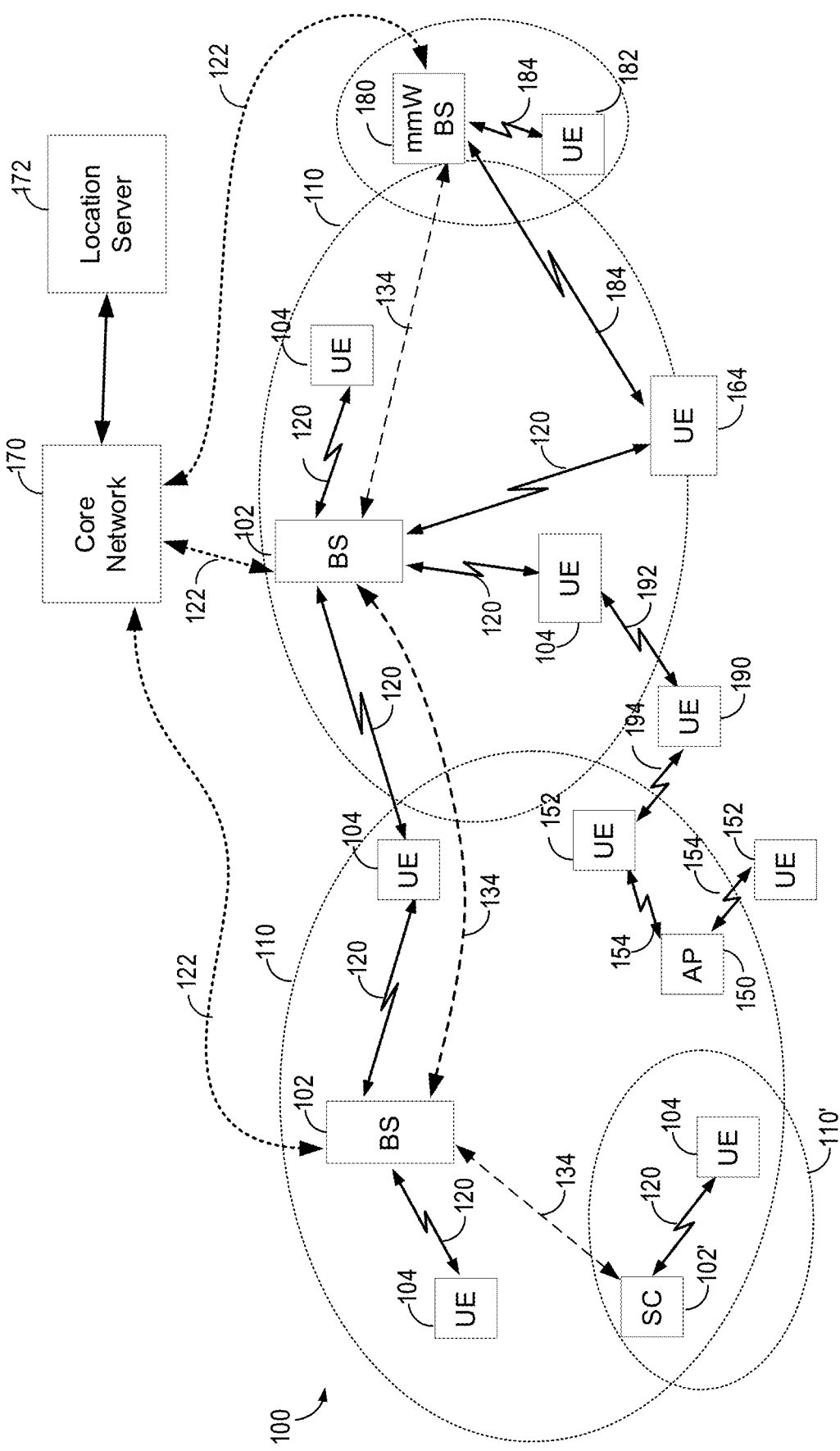
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. In some systems, a base station may correspond to a Customer Premise Equipment (CPE) or a road-side unit (RSU). In some designs, a base station may correspond to a high-powered UE (e.g., a vehicle UE or VUE) that may provide limited certain infrastructure functionality. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
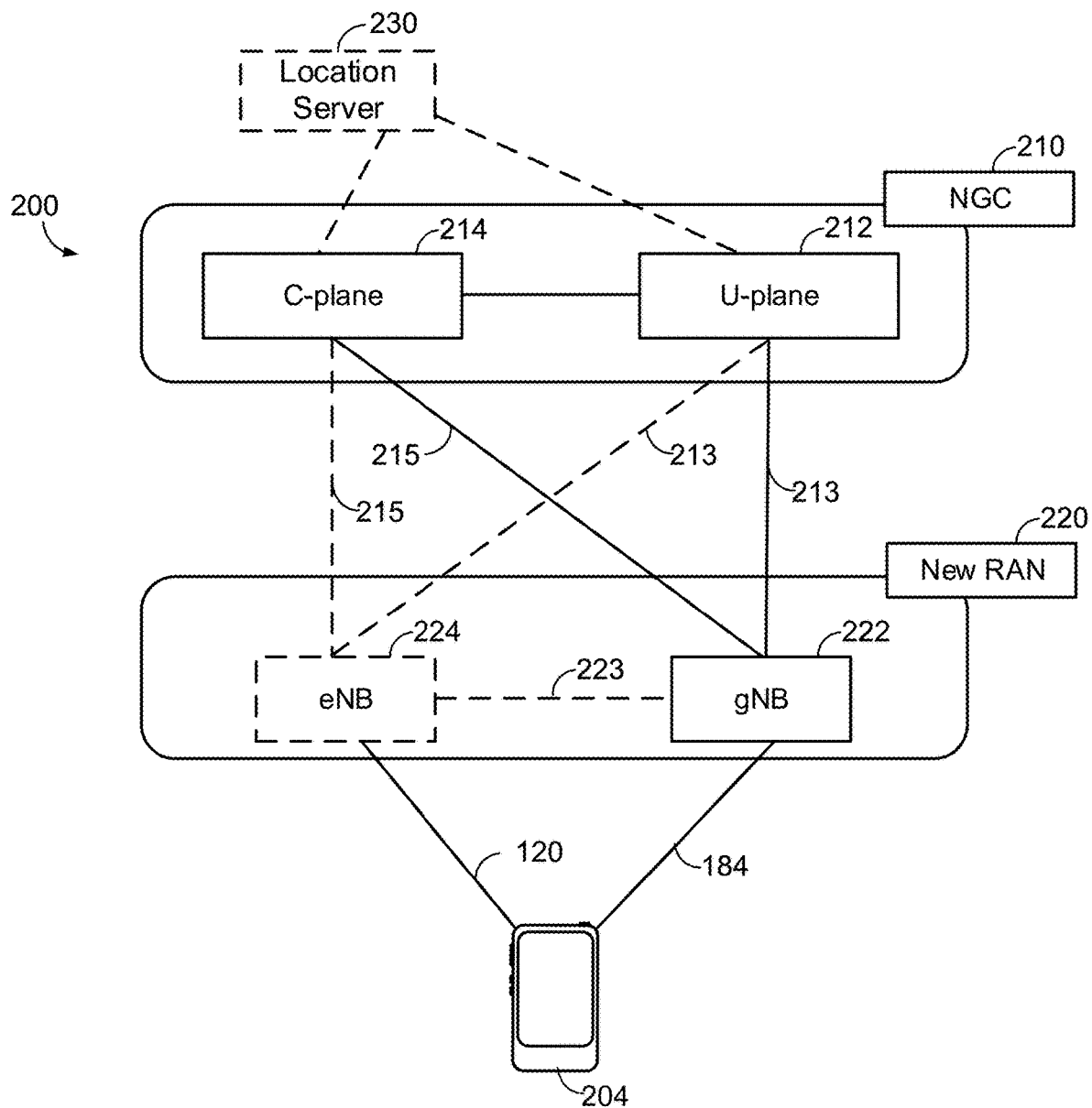
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
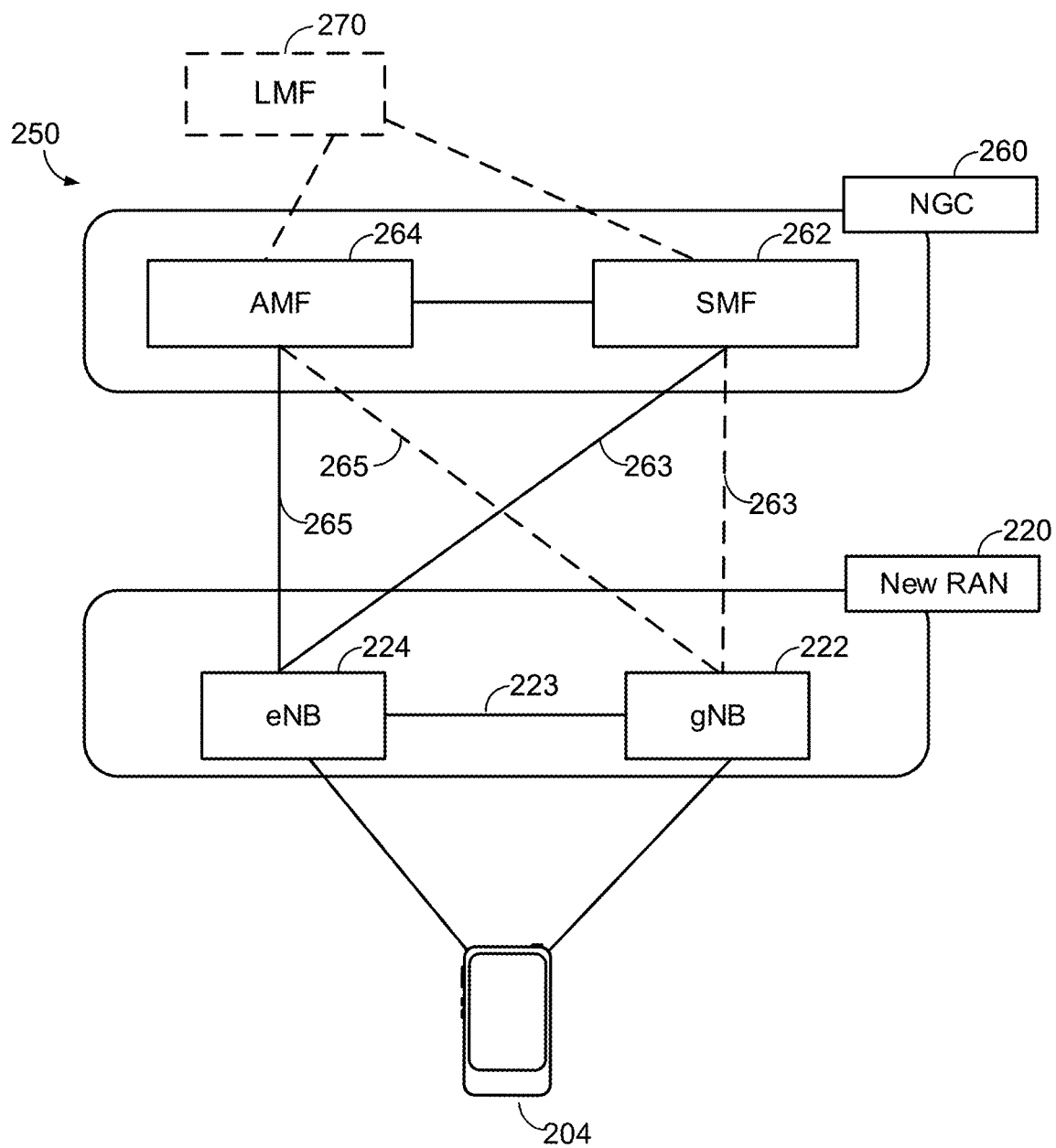

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
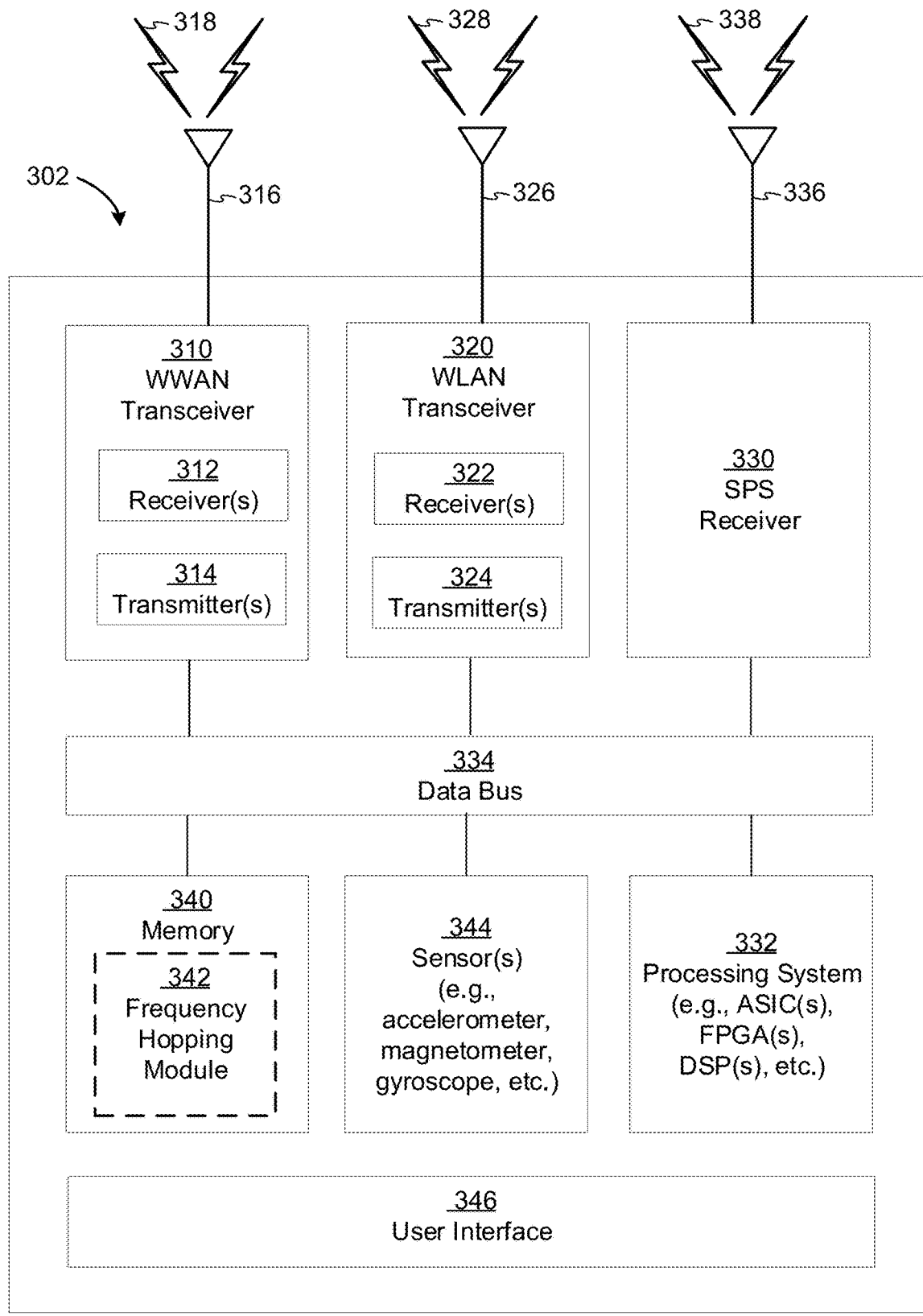
FIGS. 3A to 3C are simplified block diagrams of several sample aspects of components that may be employed in wireless communication nodes and configured to support communication as taught herein.
Figure 3B:
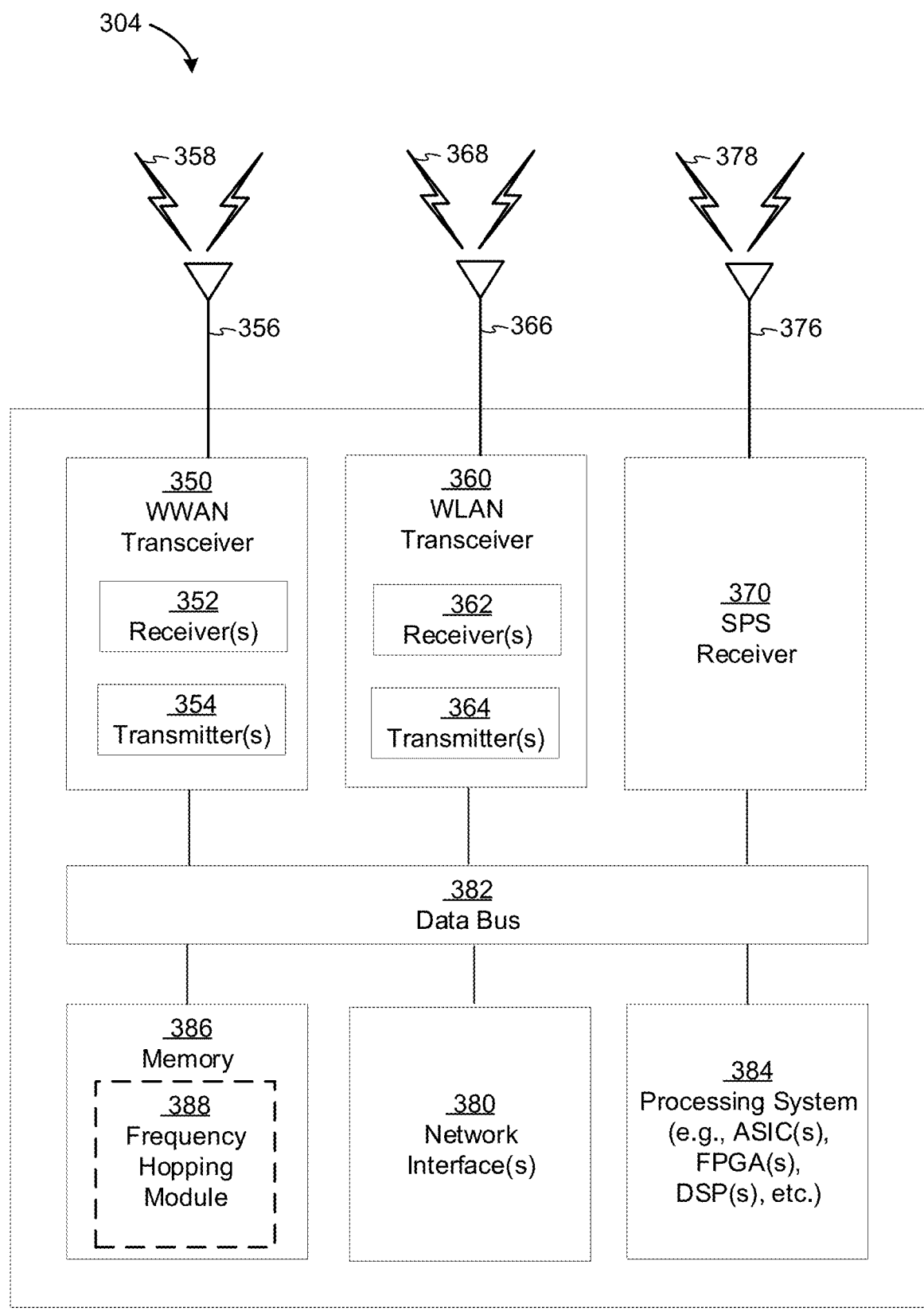
Figure 3C:
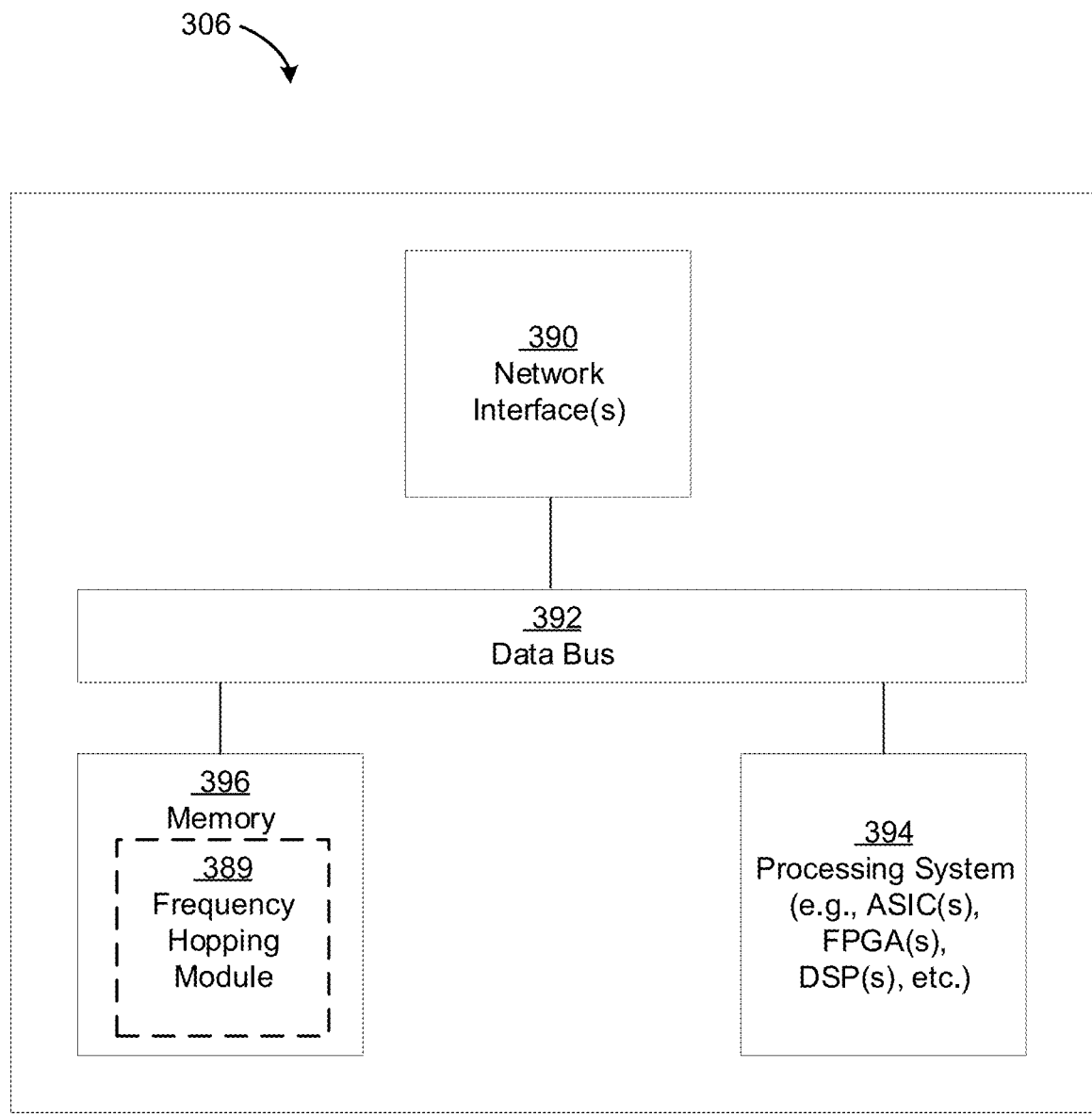

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include frequency hopping modules 342, 388, and 389, respectively. The frequency hopping modules 342, 388 and 389 may be hardware circuits that are part of or coupled to the processing systems 332, 384, and 394, respectively, that, when executed, cause the apparatuses 302, 304, and 306 to perform the functionality described herein. Alternatively, the frequency hopping modules 342, 388 and 389 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such as a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 389 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the frequency hopping modules 342, 388 and 389, etc.

Figure 4A:
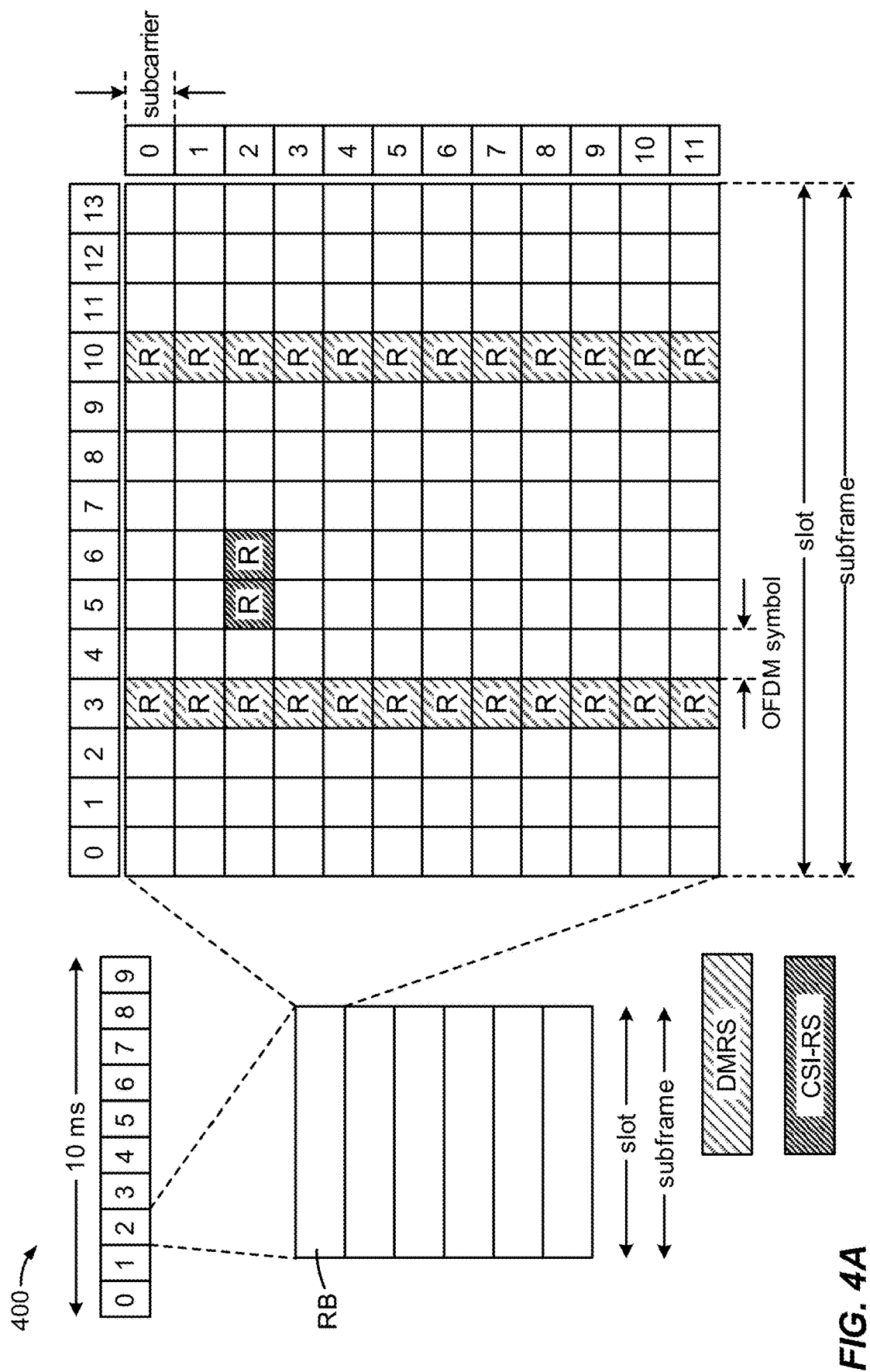
FIGS. 4A and 4B are diagrams illustrating examples of frame structures and channels within the frame structures, according to aspects of the disclosure.
Figure 4B:
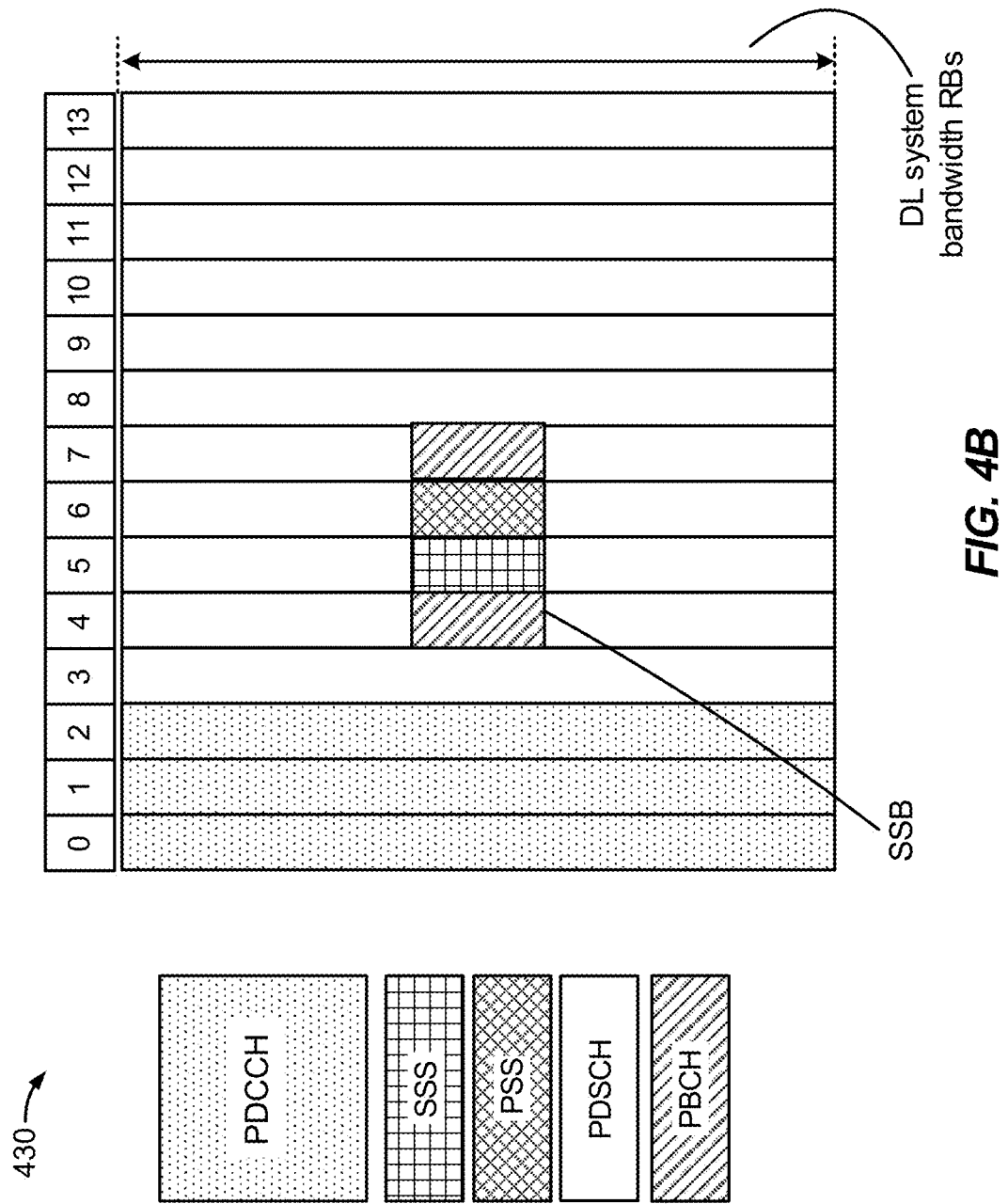

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ sub- frame | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

Figure 5:
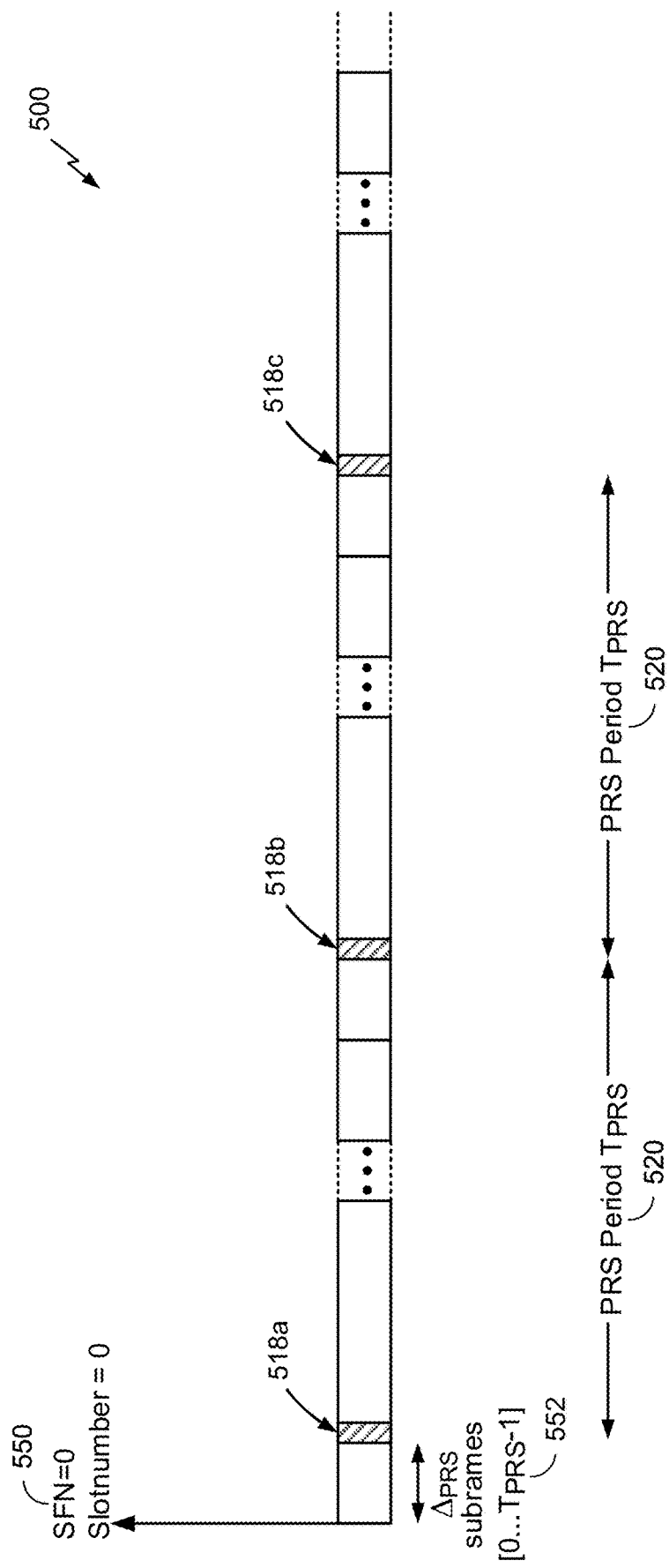
FIG. 5 illustrates an exemplary PRS configuration for a cell supported by a wireless node.

In some cases, the DL RS illustrated in FIG. 4A may be positioning reference signals (PRS). FIG. 5 illustrates an exemplary PRS configuration 500 for a cell supported by a wireless node (such as a base station 102). FIG. 5 shows how PRS positioning occasions are determined by a system frame number (SFN), a cell specific subframe offset (APRS) 552, and the PRS periodicity ($T_{PRS}$) 520. Typically, the cell specific PRS subframe configuration is defined by a "PRS Configuration Index" $I_{PRS}$ included in observed time difference of arrival (OTDOA) assistance data. The PRS periodicity ($T_{PRS}$) 520 and the cell specific subframe offset (APRS) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-2404 | 5 | $I_{PRS} - 2400$ |
| 2405-2414 | 10 | $I_{PRS} - 2405$ |
| 2415-2434 | 20 | $I_{PRS} - 2415$ |
| 2435-2474 | 40 | $I_{PRS} - 2435$ |
| 2475-2554 | 80 | $I_{PRS} - 2475$ |
| 2555-4095 | Reserved | |

A PRS configuration is defined with reference to the SFN of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0, \quad \text{Equation 1}$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell specific subframe offset APRS 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset APRS using Table 2. The UE may then determine the radio frame, subframe, and slot when a PRS is scheduled in the cell (e.g., using Equation (1)). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). In some designs, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE or NR systems. However, as used herein, unless otherwise indicated, the terms "positioning reference signal" and "PRS" refer to any type of reference signal that can be used for positioning, such as but not limited to, PRS signals in LTE or NR, navigation reference signals (NRSs) in 5G, transmitter reference signals (TRSs), cell-specific reference signals (CRSs), channel state information reference signals (CSI-RSs), primary synchronization signals (PSSs), secondary synchronization signals (SSSs), SSB, etc.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, SRSs in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \leq N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , $K_{TC}-1$ REs. Thus, for comb spacing $K_{TC}=2$, there are 2 different combs available for multiplexing if needed, and for comb spacing $K_{TC}=4$, there are 4 different available combs.

Periodicity and slot offset for the case of periodic/semi-persistent SRS.

Sounding bandwidth within a bandwidth part.

For low latency positioning, a gNB may trigger a UL SRS-P via a DCI (e.g., transmitted SRS-P may include repetition or beam-sweeping to enable several gNBs to receive the SRS-P). Alternatively, the gNB may send information regarding aperiodic PRS transmission to the UE (e.g., this configuration may include information about PRS from multiple gNBs to enable the UE to perform timing computations for positioning (UE-based) or for reporting (UE-assisted). While various embodiments of the present disclosure relate to DL PRS-based positioning procedures, some or all of such embodiments may also apply to UL SRS-P-based positioning procedures.

Note that the terms "sounding reference signal", "SRS" and "SRS-P" may sometimes refer to specific reference signals that are used for positioning in LTE or NR systems. However, as used herein, unless otherwise indicated, the terms "sounding reference signal", "SRS" and "SRS-P" refer to any type of reference signal that can be used for positioning, such as but not limited to, SRS signals in LTE or NR, navigation reference signals (NRSs) in 5G, transmitter reference signals (TRSs), random access channel (RACH) signals for positioning (e.g., RACH preambles, such as Msg-1 in 4-Step RACH procedure or Msg-A in 2-Step RACH procedure), etc.

3GPP Rel. 16 introduced various NR positioning aspects directed to increase location accuracy of positioning schemes that involve measurement(s) associated with one or more UL or DL PRSs (e.g., higher bandwidth (BW), FR2 beam-sweeping, angle-based measurements such as Angle of Arrival (AoA) and Angle of Departure (AoD) measurements, multi-cell Round-Trip Time (RTT) measurements, etc.). If latency reduction is a priority, then UE-based positioning techniques (e.g., DL-only techniques without UL location measurement reporting) are typically used. However, if latency is less of a concern, then UE-assisted positioning techniques can be used, whereby UE-measured data is reported to a network entity (e.g., location server 230, LMF 270, etc.). Latency associated UE-assisted positioning techniques can be reduced somewhat by implementing the LMF in the RAN.

Layer-3 (L3) signaling (e.g., RRC or Location Positioning Protocol (LPP)) is typically used to transport reports that comprise location-based data in association with UE-assisted positioning techniques. L3 signaling is associated with relatively high latency (e.g., above 100 ms) compared with Layer-1 (L1, or PHY layer) signaling or Layer-2 (L2, or MAC layer) signaling. In some cases, lower latency (e.g., less than 100 ms, less than 10 ms, etc.) between the UE and the RAN for location-based reporting may be desired. In such cases, L3 signaling may not be capable of reaching these lower latency levels. L3 signaling of positioning measurements may comprise any combination of the following:

One or multiple TOA, TDOA, RSRP or Rx-Tx measurements,
One or multiple AoA/AoD (e.g., currently agreed only for gNB→LMF reporting DL AoA and UL AoD) measurements,
One or multiple Multipath reporting measurements, e.g., per-path ToA, RSRP, AoA/AoD (e.g., currently only per-path ToA allowed in LTE)
One or multiple motion states (e.g., walking, driving, etc.) and trajectories (e.g., currently for UE), and/or
One or multiple report quality indications.

More recently, L1 and L2 signaling has been contemplated for use in association with PRS-based reporting. For example, L1 and L2 signaling is currently used in some systems to transport CSI reports (e.g., reporting of Channel Quality Indications (CQIs), Precoding Matrix Indicators (PMIs), Layer Indicators (Lis), L1-RSRP, etc.). CSI reports may comprise a set of fields in a pre-defined order (e.g., defined by the relevant standard). A single UL transmission (e.g., on PUSCH or PUCCH) may include multiple reports, referred to herein as 'sub-reports', which are arranged according to a pre-defined priority (e.g., defined by the relevant standard). In some designs, the pre-defined order may be based on an associated sub-report periodicity (e.g., aperiodic/semi-persistent/periodic (A/SP/P) over PUSCH/PUCCH), measurement type (e.g., L1-RSRP or not), serving cell index (e.g., in carrier aggregation (CA) case), and reportconfigID. With 2-part CSI reporting, the part 1s of all reports are grouped together, and the part 2s are grouped separately, and each group is separately encoded (e.g., part 1 payload size is fixed based on configuration parameters, while part 2 size is variable and depends on configuration parameters and also on associated part 1 content). A number of coded bits/symbols to be output after encoding and rate-matching is computed based on a number of input bits and beta factors, per the relevant standard. Linkages (e.g., time offsets) are defined between instances of RSs being measured and corresponding reporting. In some designs, CSI-like reporting of PRS-based measurement data using L1 and L2 signaling may be implemented.

Figure 6:
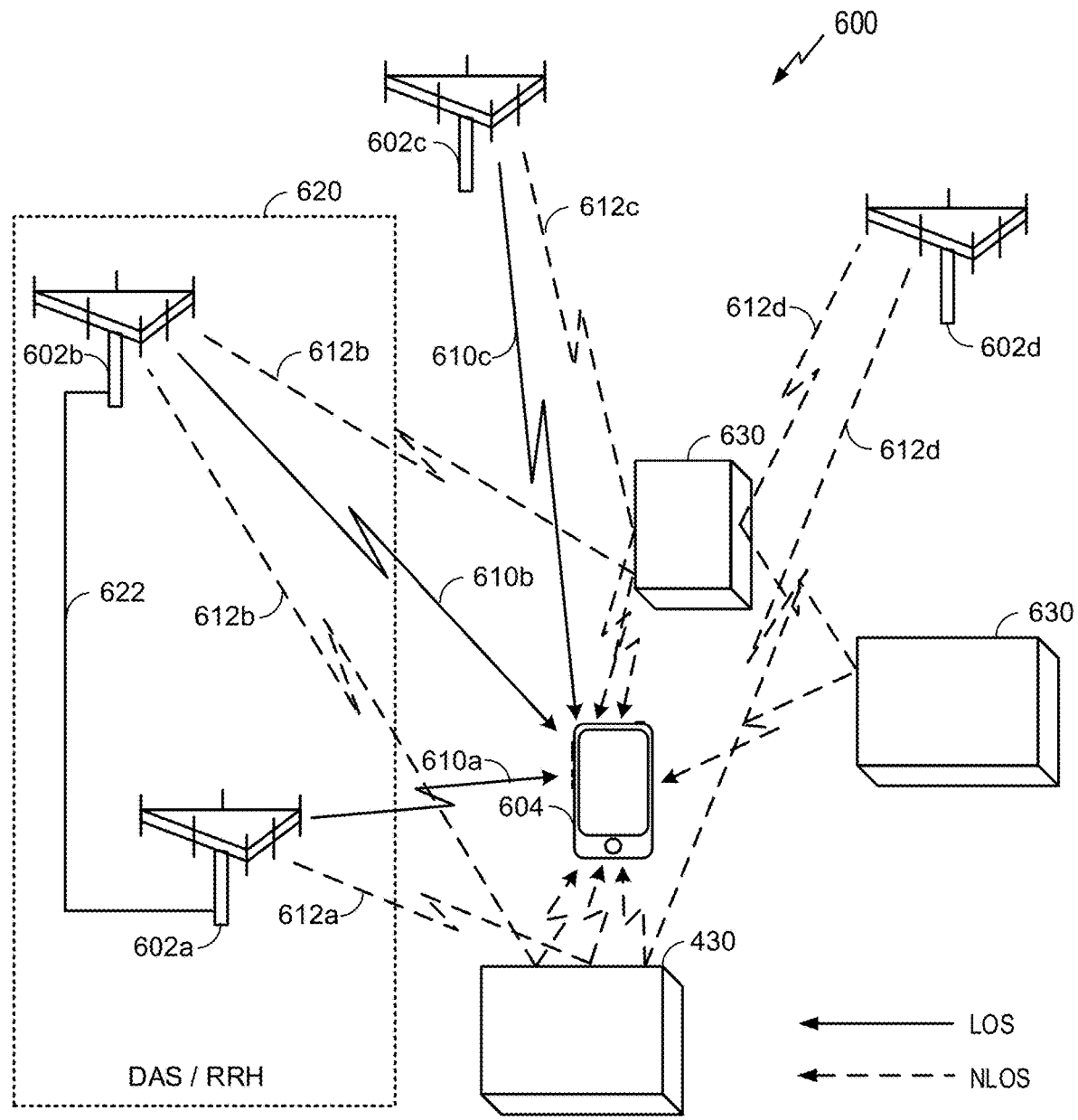
FIG. 6 illustrates an exemplary wireless communications system according to various aspects of the disclosure.

FIG. 6 illustrates an exemplary wireless communications system 600 according to various aspects of the disclosure. In the example of FIG. 6, a UE 604, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602a-d (collectively, base stations 602), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 600 (i.e., the base stations locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and four base stations 602, as will be appreciated, there may be more UEs 604 and more or fewer base stations 602.

To support position estimates, the base stations 602 may be configured to broadcast reference RF signals (e.g., Positioning Reference Signals (PRS), Cell-specific Reference Signals (CRS), Channel State Information Reference Signals (CSI-RS), synchronization signals, etc.) to UEs 604 in their coverage areas to enable a UE 604 to measure reference RF signal timing differences (e.g., OTDOA or RSTD) between pairs of network nodes and/or to identify the beam that best excite the LOS or shortest radio path between the UE 604 and the transmitting base stations 602. Identifying the LOS/shortest path beam(s) is of interest not only because these beams can subsequently be used for OTDOA measurements between a pair of base stations 602, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 602, a cell of a base station 602, a remote radio head, an antenna of a base station 602, where the locations of the antennas of a base station 602 are distinct from the location of the base station 602 itself, or any other network entity capable of transmitting reference signals. Further, as used herein, a "node" may refer to either a network node or a UE.

A location server (e.g., location server 230) may send assistance data to the UE 604 that includes an identification of one or more neighbor cells of base stations 602 and configuration information for reference RF signals transmitted by each neighbor cell. Alternatively, the assistance data can originate directly from the base stations 602 themselves (e.g., in periodically broadcasted overhead messages, etc.). Alternatively, the UE 604 can detect neighbor cells of base stations 602 itself without the use of assistance data. The UE 604 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 602 or antenna(s) that transmitted the reference RF signals that the UE 604 measured), the UE 604 or the location server can determine the distance between the UE 604 and the measured network nodes and thereby calculate the location of the UE 604.

The term "position estimate" is used herein to refer to an estimate of a position for a UE 604, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 602) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 604) and a neighbor base station whose reference RF signals the UE is measuring. Thus, FIG. 6 illustrates an aspect in which base stations 602a and 602b form a DAS/RRH 620. For example, the base station 602a may be the serving base station of the UE 604 and the base station 602b may be a neighbor base station of the UE 604. As such, the base station 602b may be the RRH of the base station 602a. The base stations 602a and 602b may communicate with each other over a wired or wireless link 622.

To accurately determine the position of the UE 604 using the OTDOAs and/or RSTDs between RF signals received from pairs of network nodes, the UE 604 needs to measure the reference RF signals received over the LOS path (or the shortest NLOS path where an LOS path is not available), between the UE 604 and a network node (e.g., base station 602, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 6 illustrates a number of LOS paths 610 and a number of NLOS paths 612 between the base stations 602 and the UE 604. Specifically, FIG. 6 illustrates base station 602a transmitting over an LOS path 610a and an NLOS path 612a, base station 602b transmitting over an LOS path 610b and two NLOS paths 612b, base station 602c transmitting over an LOS path 610c and an NLOS path 612c, and base station 602d transmitting over two NLOS paths 612d. As illustrated in FIG. 6, each NLOS path 612 reflects off some object 630 (e.g., a building). As will be appreciated, each LOS path 610 and NLOS path 612 transmitted by a base station 602 may be transmitted by different antennas of the base station 602 (e.g., as in a MIMO system), or may be transmitted by the same antenna of a base station 602 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 602 may be configured to use beamforming to transmit RF signals. In that case, some of the available beams may focus the transmitted RF signal along the LOS paths 610 (e.g., the beams produce highest antenna gain along the LOS paths) while other available beams may focus the transmitted RF signal along the NLOS paths 612. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 602 uses beamforming to transmit RF signals, the beams of interest for data communication between the base station 602 and the UE 604 will be the beams carrying RF signals that arrive at UE 604 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 610). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 7, in some cases, the signal strength of RF signals on the LOS path 610 may be weaker (e.g., due to obstructions) than the signal strength of RF signals on an NLOS path 612, over which the RF signals arrive later due to propagation delay.

Figure 7:
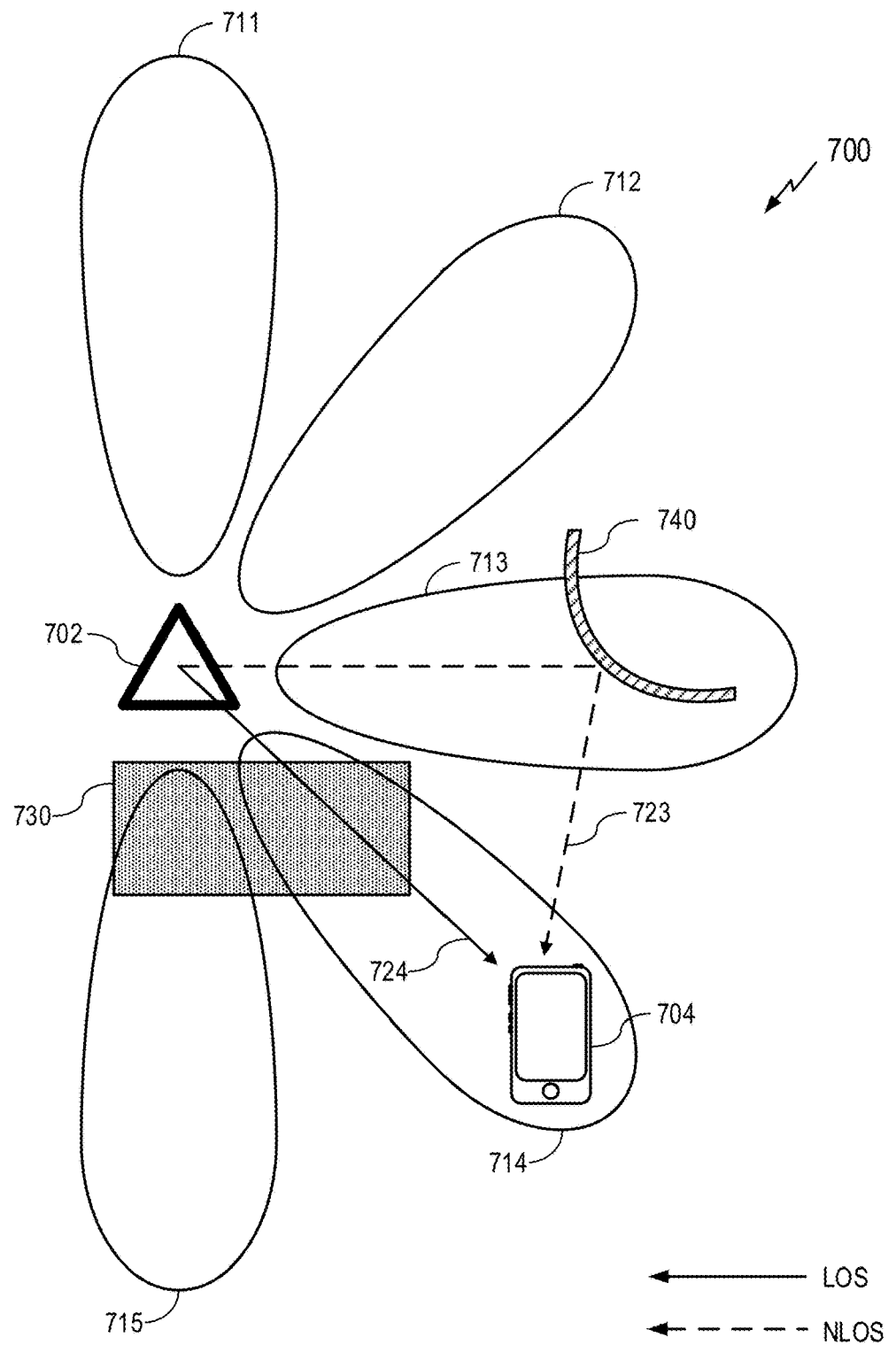
FIG. 7 illustrates an exemplary wireless communications system according to various aspects of the disclosure.

FIG. 7 illustrates an exemplary wireless communications system 700 according to various aspects of the disclosure. In the example of FIG. 7, a UE 704, which may correspond to UE 604 in FIG. 6, is attempting to calculate an estimate of its position, or to assist another entity (e.g., a base station or core network component, another UE, a location server, a third party application, etc.) to calculate an estimate of its position. The UE 704 may communicate wirelessly with a base station 702, which may correspond to one of base stations 602 in FIG. 6, using RF signals and standardized protocols for the modulation of the RF signals and the exchange of information packets.

As illustrated in FIG. 7, the base station 702 is utilizing beamforming to transmit a plurality of beams 711-715 of RF signals. Each beam 711-715 may be formed and transmitted by an array of antennas of the base station 702. Although FIG. 7 illustrates a base station 702 transmitting five beams 711-715, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 711-715 for purposes of distinguishing RF signals associated with one beam from RF signals associated with another beam. Moreover, the RF signals associated with a particular beam of the plurality of beams 711-715 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 7, the UE 704 receives an NLOS data stream 723 of RF signals transmitted on beam 713 and an LOS data stream 724 of RF signals transmitted on beam 714. Although FIG. 7 illustrates the NLOS data stream 723 and the LOS data stream 724 as single lines (dashed and solid, respectively), as will be appreciated, the NLOS data stream 723 and the LOS data stream 724 may each comprise multiple rays (i.e., a "cluster") by the time they reach the UE 704 due, for example, to the propagation characteristics of RF signals through multipath channels. For example, a cluster of RF signals is formed when an electromagnetic wave is reflected off of multiple surfaces of an object, and reflections arrive at the receiver (e.g., UE 704) from roughly the same angle, each travelling a few wavelengths (e.g., centimeters) more or less than others. A "cluster" of received RF signals generally corresponds to a single transmitted RF signal.

In the example of FIG. 7, the NLOS data stream 723 is not originally directed at the UE 704, although, as will be appreciated, it could be, as are the RF signals on the NLOS paths 612 in FIG. 6. However, it is reflected off a reflector 740 (e.g., a building) and reaches the UE 704 without obstruction, and therefore, may still be a relatively strong RF signal. In contrast, the LOS data stream 724 is directed at the UE 704 but passes through an obstruction 730 (e.g., vegetation, a building, a hill, a disruptive environment such as clouds or smoke, etc.), which may significantly degrade the RF signal. As will be appreciated, although the LOS data stream 724 is weaker than the NLOS data stream 723, the LOS data stream 724 will arrive at the UE 704 before the NLOS data stream 723 because it follows a shorter path from the base station 702 to the UE 704.

As noted above, the beam of interest for data communication between a base station (e.g., base station 702) and a UE (e.g., UE 704) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 714). That is, even if beam 713 (the NLOS beam) were to weakly excite the LOS path (due to the propagation characteristics of RF signals, even though not being focused along the LOS path), that weak signal, if any, of the LOS path of beam 713 may not be as reliably detectable (compared to that from beam 714), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 7, where the UE 704 is engaged in a data communication session with the base station 702 (e.g., where the base station 702 is the serving base station for the UE 704) and not simply attempting to measure reference RF signals transmitted by the base station 702, the beam of interest for the data communication session may be the beam 713, as it is carrying the unobstructed NLOS data stream 723. The beam of interest for position estimation, however, would be the beam 714, as it carries the strongest LOS data stream 724, despite being obstructed.

Figure 8A:
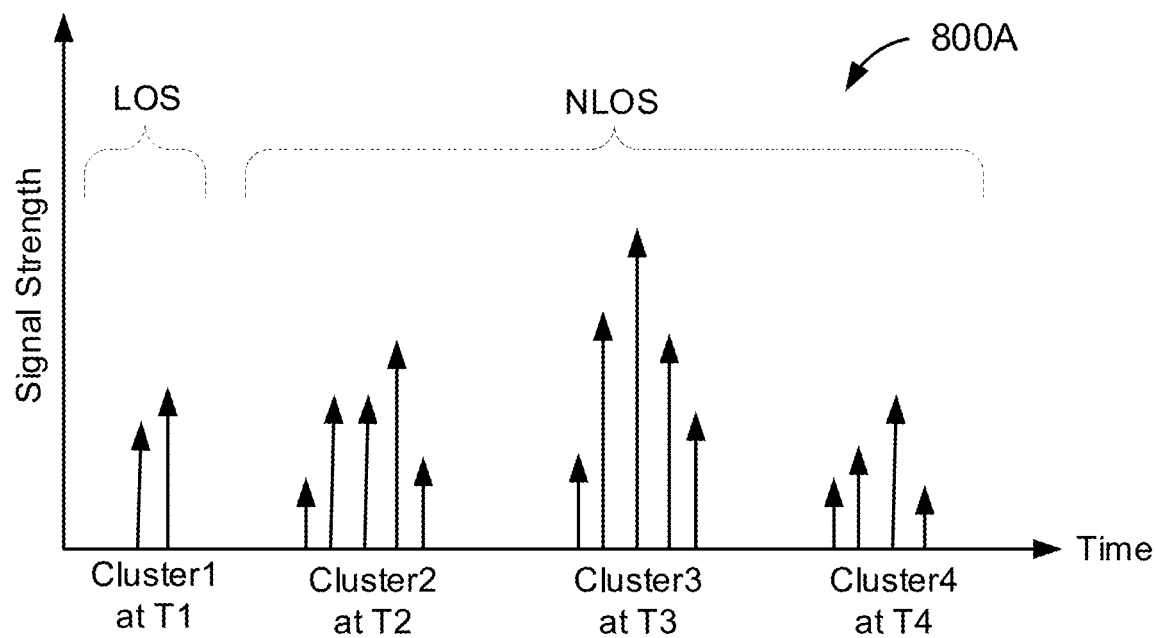
FIG. 8A is a graph showing the RF channel response at a receiver over time according to aspects of the disclosure.
Figure 8B:
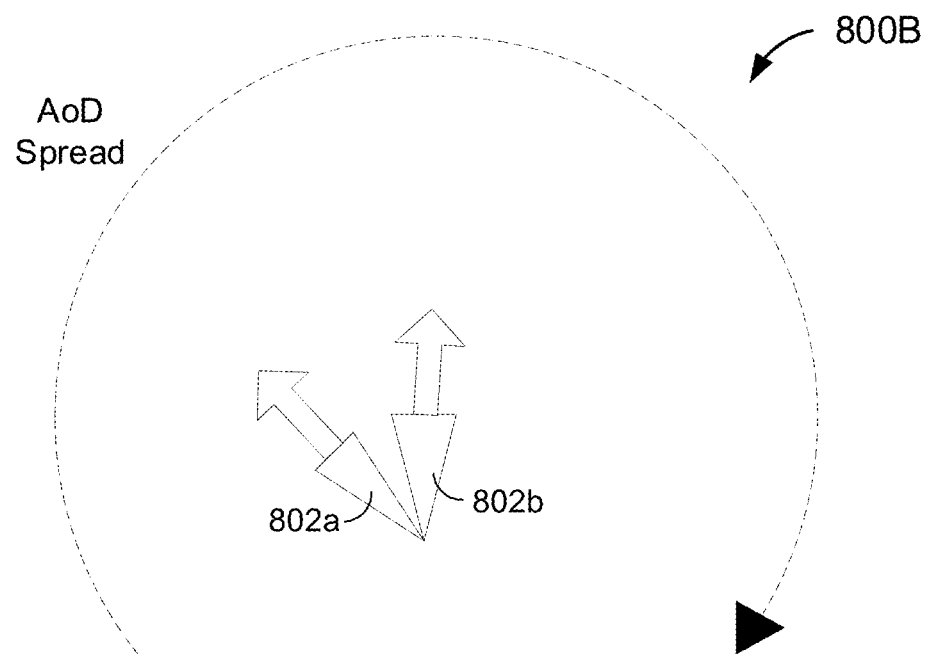
FIG. 8B is a diagram illustrating this separation of clusters in AoD.

FIG. 8A is a graph 800A showing the RF channel response at a receiver (e.g., UE 704) over time according to aspects of the disclosure. Under the channel illustrated in FIG. 8A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 8A, because the first cluster of RF signals at time T1 arrives first, it is presumed to be the LOS data stream (i.e., the data stream arriving over the LOS or the shortest path), and may correspond to the LOS data stream 724. The third cluster at time T3 is comprised of the strongest RF signals, and may correspond to the NLOS data stream 723. Seen from the transmitter's side, each cluster of received RF signals may comprise the portion of an RF signal transmitted at a different angle, and thus each cluster may be said to have a different angle of departure (AoD) from the transmitter. FIG. 8B is a diagram 800B illustrating this separation of clusters in AoD. The RF signal transmitted in AoD range 802a may correspond to one cluster (e.g., "Cluster1") in FIG. 8A, and the RF signal transmitted in AoD range 802b may correspond to a different cluster (e.g., "Cluster3") in FIG. 8A. Note that although AoD ranges of the two clusters depicted in FIG. 8B are spatially isolated, AoD ranges of some clusters may also partially overlap even though the clusters are separated in time. For example, this may arise when two separate buildings at same AoD from the transmitter reflect the signal towards the receiver. Note that although FIG. 8A illustrates clusters of two to five channel taps (or "peaks"), as will be appreciated, the clusters may have more or fewer than the illustrated number of channel taps.

RAN1 NR may define UE measurements on DL reference signals (e.g., for serving, reference, and/or neighboring cells) applicable for NR positioning, including DL reference signal time difference (RSTD) measurements for NR positioning, DL RSRP measurements for NR positioning, and UE Rx-Tx (e.g., a hardware group delay from signal reception at UE receiver to response signal transmission at UE transmitter, e.g., for time difference measurements for NR positioning, such as RTT).

RAN1 NR may define gNB measurements based on UL reference signals applicable for NR positioning, such as relative UL time of arrival (RTOA) for NR positioning, UL AoA measurements (e.g., including Azimuth and Zenith Angles) for NR positioning, UL RSRP measurements for NR positioning, and gNB Rx-Tx (e.g., a hardware group delay from signal reception at gNB receiver to response signal transmission at gNB transmitter, e.g., for time difference measurements for NR positioning, such as RTT).

As noted above, various device types may be characterized as UEs. Starting in 3GPP Rel. 17, a number of these UE types are being allocated a new UE classification denoted as "NR-Light" UEs or reduced capability ("RedCap") UEs.

Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.) for transmission and/or reception, maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on. In one particular example, industrial IoT TOT) wireless sensors may be associated with intensive uplink traffic, moderate reliability and latency (e.g., non-URLLC), small packet size with a relatively long TX interval (e.g., low data rate), and high capacity (e.g., up to 1 UE per square meter).

In some designs, the bandwidth for a DL-PRS may be relatively large (e.g., 100 MHz), and a RedCap UE may only be capable of measuring or transmitting on a portion (e.g., 20 MHz) of the DL-PRS bandwidth at any given time. To compensate for this limitation, the RedCap UE may implement a frequency hopping scheme.

In some designs, "coherent stitching" may be used to process the respective frequency hops associated with the DL-PRS measurement. However, coherent stitching may add to complexity of UE implementation. In some designs, "non-coherent stitching" may provide some performance improvement, due to diversity gains. In some designs such as NR Rel. 16, DL-PRS frequency hopping is not supported, a smallest DL-PRS bandwidth is 24 PRBs and a highest DL-PRS bandwidth is 272 PRBs. In this case, UEs are simply assumed to be capable of processing a single positioning frequency layer (PFL) to derive DL-PRS measurements, and UEs are assumed to be processing a single PFL at a time. In some designs such as NR Rel. 17, stitching of DL-PRS from different PFLs may be supported for the purpose of increasing the DL-PRS bandwidth above the 272 PRB limitation of NR Rel-16. In some designs such as further enhanced machine type communication (FeMTC), frequency hopping is supported for 1.4 MHz DL-PRS BW. In FeMTC, the DL-PRS starts from the center of system BW and hops every PRS occasion, where the hopping location being explicitly specified by LTE positioning protocol (LPP) (e.g., up to 16 hops are specified, but the UE can hop 2 or 4 out of the 16).

PRS may comprise PRS resources, PRS resource sets, or PRS resources of a frequency layer. A DL-PRS positioning frequency layer (or simply a frequency layer) is a collection of DL-PRS resource sets that have common parameters configured by the parameter DL-PRS-PositioningFrequencyLayer. Each frequency layer has the same DL-PRS subcarrier spacing (SCS) for the DL-PRS resource sets and the DL-PRS resources in the frequency layer. Each frequency layer has the same DL-PRS cyclic prefix (CP) type for the DL-PRS resource sets and the DL-PRS resources in the frequency layer. Also, a DL-PRS Point A parameter defines a frequency of a reference resource block, with DL-PRS resources belonging to the same DL-PRS resource set having the same Point A and all DL-PRS resource sets belonging to the same frequency layer having the same Point A. The PRS resource sets of a frequency layer also have the same start PRB (and center frequency) and the same comb-size value.

As used herein, a positioning session may comprise a plurality of PRS instances, with each PRS instance comprising a PRS resource set. The PRS resource set in turn comprises a plurality of PRS resources. For example, in some implementations, a positioning session may span around 20 seconds, whereas each PRS instance may span around 160 ms. DL-PRS resources may be repeated to facilitate Rx beam sweeping across different repetitions, combining gains for coverage extension, and/or intra-instance muting. In some designs, PRS configurations can support a number of repetition counts (PRS-ResourceRepetitionFactor) and a number of time gaps (PRS-ResourceTimeGap), as shown in Table 2:

TABLE 2

| Parameter | Functionality |
| --- | --- |
| PRS-ResourceRepetitionFactor | Number of times each PRS Resource is repeated for a single instance of the PRS Resource Set<br>Values: 1, 2, 4, 6, 8, 16, 32 |
| PRS-ResourceTimeGap | Offset in units of slots between two repeated instances of a DL-PRS Resource corresponding to the same PRS Resource ID within a single instance of the DL-PRS Resource Set<br>Values: 1, 2, 4, 8, 16, 32 |

Figure 9:
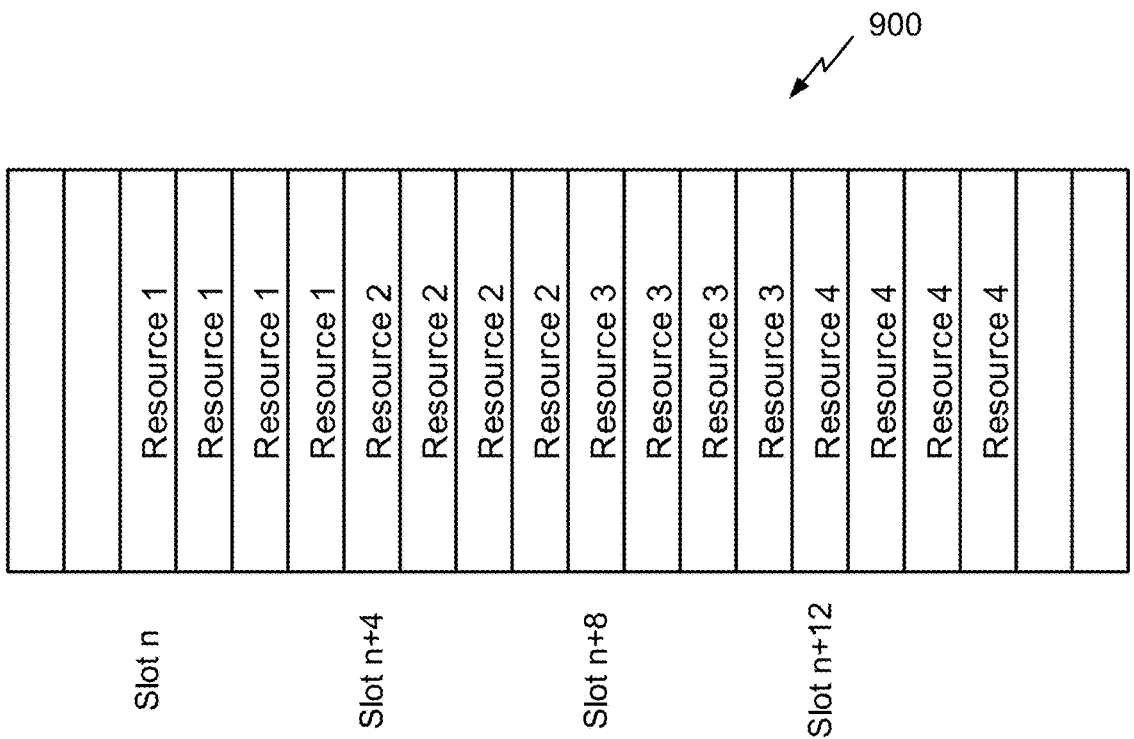
FIG. 9 illustrates a PRS resource distribution in accordance with an embodiment of the disclosure.

FIG. 9 illustrates a PRS resource distribution 900 in accordance with an embodiment of the disclosure. The PRS resource distribution 900 reflects a DL-PRS Resource set with 4 resources, a PRS-ResourceRepetitionFactor of 4, and a PRS-ResourceTimeGap of 1 slot.

Figure 10:
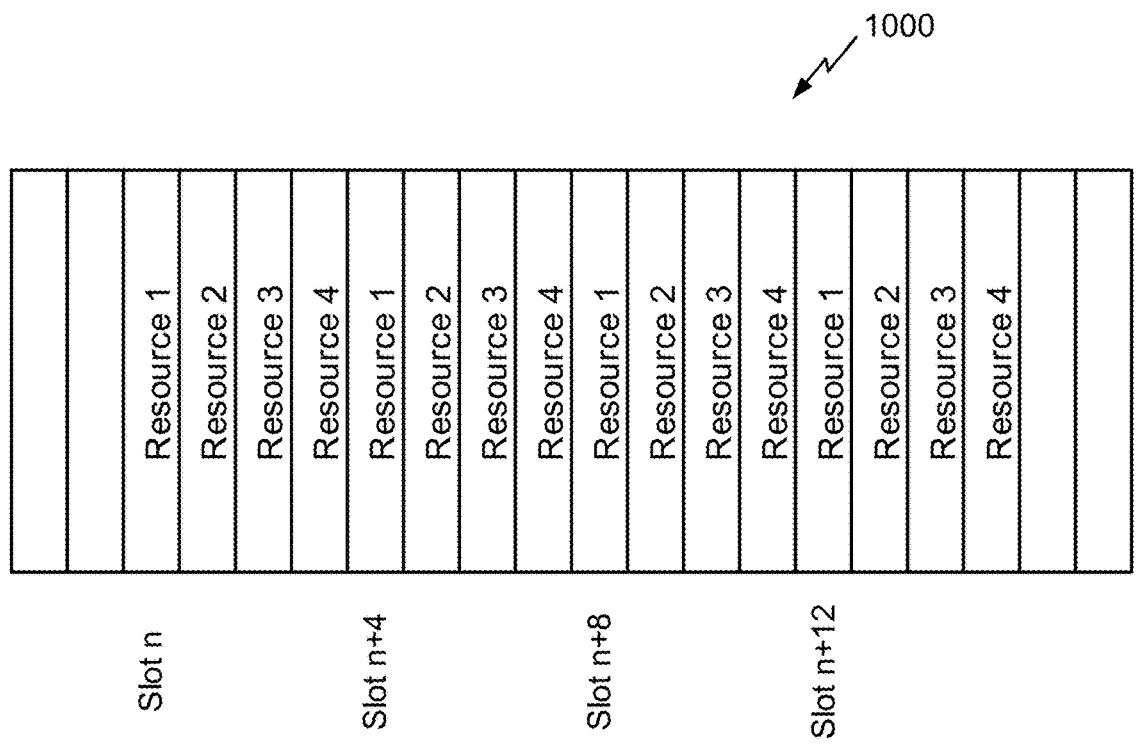
FIG. 10 illustrates a PRS resource distribution in accordance with another embodiment of the disclosure

FIG. 10 illustrates a PRS resource distribution 1000 in accordance with another embodiment of the disclosure. The PRS resource distribution 1000 reflects a DL-PRS Resource set with 4 resources, a PRS-ResourceRepetitionFactor of 4, and a PRS-ResourceTimeGap of 4 slots.

In some designs, aggregation of multiple DL positioning frequency layers of the same or different bands for improving positioning performance for both intra-band and inter-band scenarios may take into account at least the following The scenarios and performance benefits of aggregating multiple DL positioning frequency layers The impact of channel spacing, timing offset, phase offset, frequency error, and power imbalance among CCs to the positioning performance for intra-band contiguous/non-contiguous and inter-band scenarios UE complexity considerations In a specific example in accordance with some designs, when physical layer at UE receives last of NR-TDOA-ProvideAssistanceData message and NR-TDOA-RequestLocationInformation message from the LMF via LPP, UE shall be able to measure multiple (within its PRS measurement capability, nr-DL-TDOA-MeasCapability, indicated via LPP) DL RSTD measurements, defined in TS 38.215, in a positioning frequency layer i within the measurement period $T_{RSTD,i}$, e.g.:

$$T_{PRS-RSRP,i} = \left( CSSF_i * N_{RxBeam,i} * \left\lceil \frac{N_{PRS,i}^{slot}}{N'} \right\rceil \left\lceil \frac{L_{PRS,i}}{N} \right\rceil * N_{sample} - 1 \right) * T_{effect,i} + T_{last} \qquad \text{Equation 2}$$

whereby:

$N_{RxBeam,i}$ is the UE Rx beam sweeping factor. In FR1, $N_{RxBeam,i}=1$; and in FR2 when QCL info is provided and different PRS overlapped in time on the same frequency layer $N_{RxBeam,i}=[8]$, otherwise $N_{RxBeam}=[1]$, $CSSF_{RSTD,i}$ is the carrier-specific scaling factor for the positioning frequency layer i CSSFwithin_gap,i as defined in clause 9.1.5.2, $N_{sample}$ is the number of PRS samples and $N_{sample}=[4]$, $T_{last}$ is the measurement duration for a single PRS occasion which include the sampling time and processing time, which can be: $T_{last}=T_i+L_{PRS,i}$, $$T_{effect,i} = \left\lceil \frac{T_i}{T_{available\_PRS,i}} \right\rceil * T_{available\_PRS,i},$$

$$T_{available\_PRS,i} = LCM(T_{PRS,i}, MGPR_i),$$

$L_{PRS,i}$ is the time duration spanned by PRS sample of all DL PRS resources of positioning frequency layer i within one PRS period (TPRS). For the purpose of DL PRS processing capability, $L_{PRS,i}$ is calculated by either Type I duration calculation with UE symbol level buffering capability or Type II duration calculation with UE slot level buffering capability as defined in clause 5.1.6.5 of TS 38.214, $N_{PRS,i}^{slot}$ is the maximum number of DL PRS resources of positioning frequency layer i configured in a slot, {N, T} is UE capability combination per band where N is a duration of DL PRS symbols in ms processed every T ms for a given maximum bandwidth supported by UE as specified in clause 4.2.7.2 of TS 38.306, and N' is UE capability for number of DL PRS resources that it can process in a slot as specified in clause 4.2.7.2 of TS 38.306.

Figure 11:
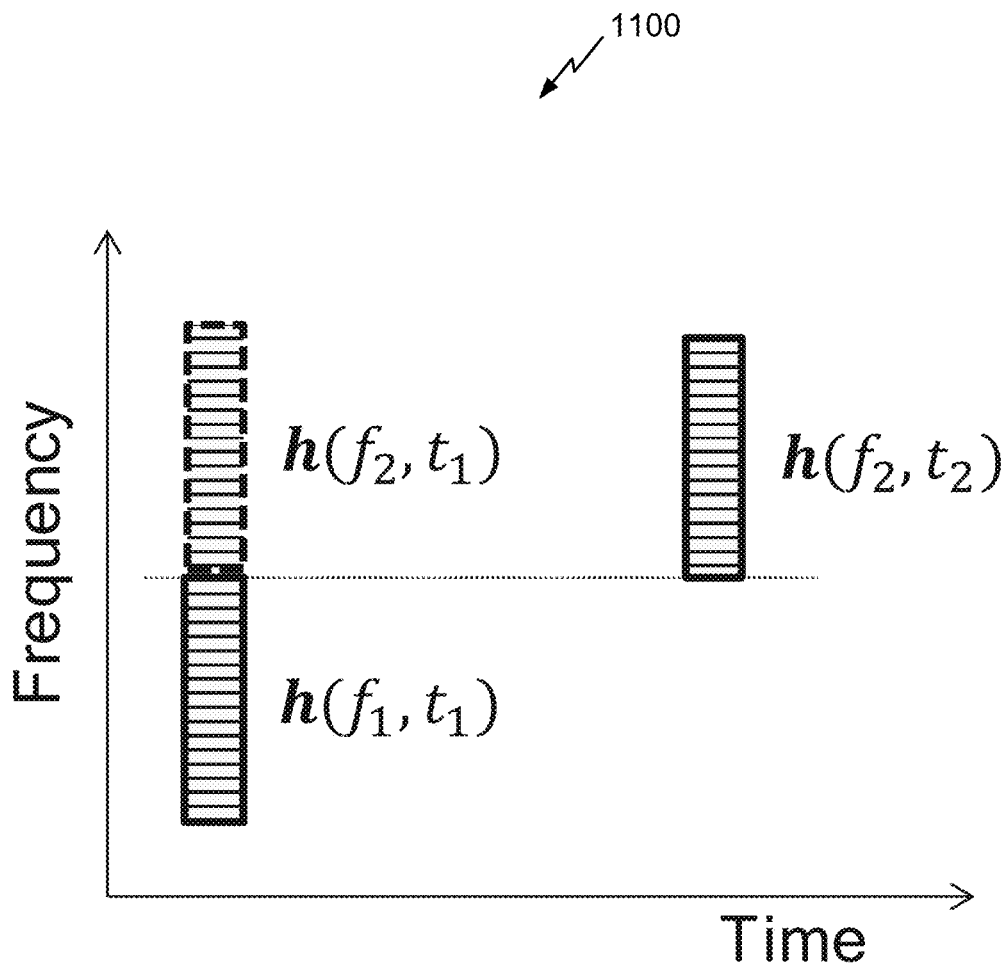
FIG. 11 illustrates a frequency hopping scheme in accordance with an aspect of the disclosure.

FIG. 11 illustrates a frequency hopping scheme 1100 in accordance with an aspect of the disclosure. In FIG. 11, an RS for positioning (e.g., PRS or SRS-P) is processed (e.g., measured or transmitted) at a RedCap UE via a series of M hops. In particular, two of the M hops are illustrated in FIG. 11, with a first frequency hop at $h(f_1, t_1)$ followed by a second frequency hop at $h(f_2, t_2)$. In case of DL-PRS, the DL-PRS is transmitted on resources corresponding to $h(f_2, t_1)$, but the RedCap UE is not capable of measuring $h(f_2, t_1)$. By hopping to different non-overlapping parts (or sub-bands) of the RS bandwidth, the RedCap UE can monitor the whole RS bandwidth (albeit, not concurrently).

Referring to FIG. 11, $h(f_2, t_1)$ is related to $h(f_2, t_2)$ through a phase offset and phase slope. Phase slope is a linear function of timestamps, while the phase offset could depend on many factors (e.g., for RF switch at each frequency hop, the phases before and after switching are different, and the difference is not controllable and does not fulfill any law, hence the term "random phase"). The relationship between, $h(f_2, t_1)$ and $h(f_2, t_2)$ may be expressed as follows:

$$h(f_2+f,t_2)=h(f_2+f,t_1) \cdot e^{-jf \cdot (\epsilon_2-\epsilon_1)} \cdot e^{j\theta} \qquad \text{Equation 3}$$

$$\epsilon_2-\epsilon_1=t_2-t_1-R \cdot (TOD_2-TOD_1) \qquad \text{Equation 4}$$

$$h(f_2+f,t_2)=h(f_2+f,t_1) \cdot e^{-e \cdot f(t_2-t_1-R \cdot (TOD_2-TOD_1))} \cdot e^{j\theta} \qquad \text{Equation 5}$$

Figure 12:
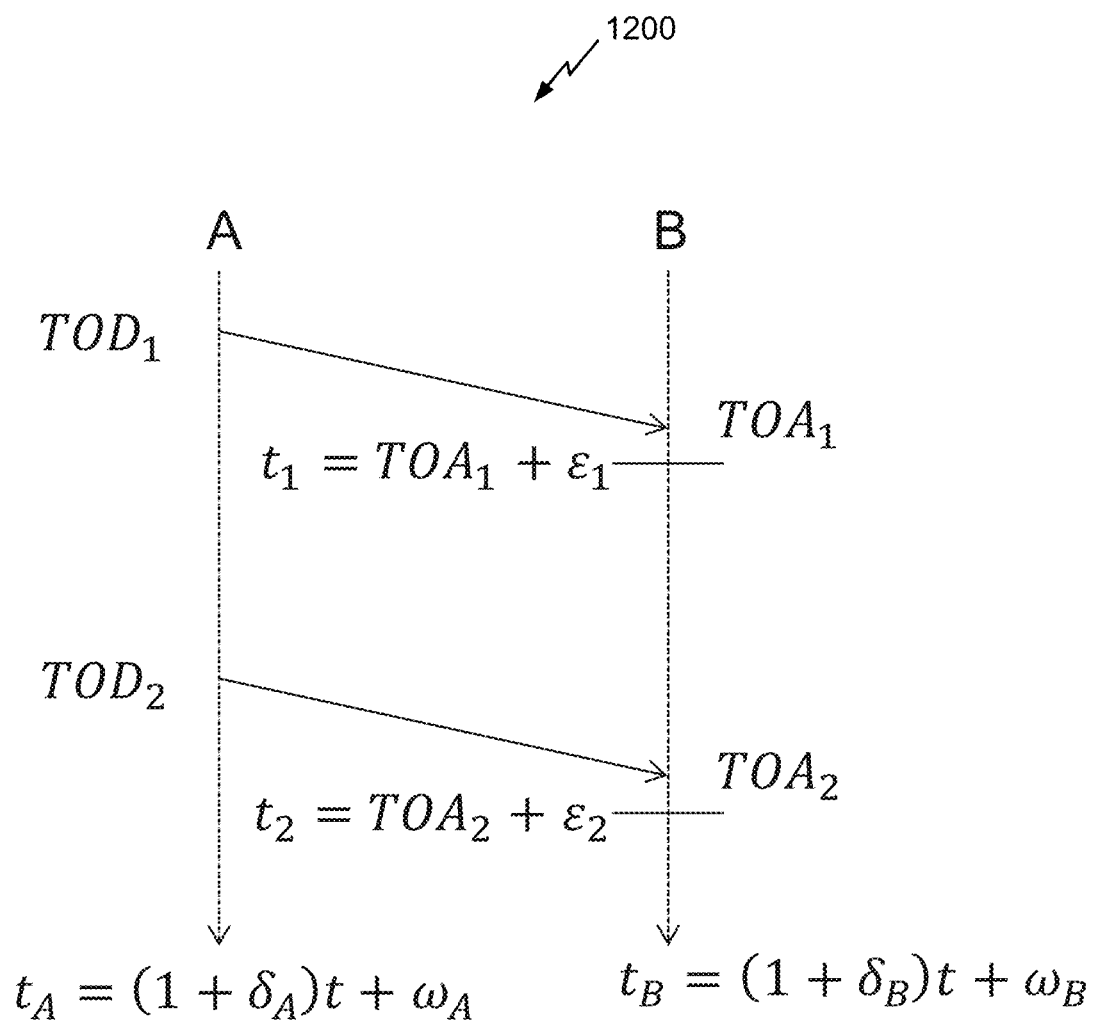
FIG. 12 illustrates a positioning scheme in accordance with an aspect of the disclosure

FIG. 12 illustrates a positioning scheme 1200 in accordance with an aspect of the disclosure. In FIG. 12, a transmitter A transmits a first PRS at $TOD_1$ which is received by receiver B at $TOA_1$, with hardware group delay $\epsilon_1$, such that $t_1=TOA_1+\epsilon_1$. The transmitter A further transmits a second PRS at $TOD_2$ which is received by receiver B at $TOA_2$, with hardware group delay $\epsilon_2$, such that $t_2=TOA_2+\epsilon_2$. The range R between the transmitter A and the receiver B may then be derived as follows:

$$R = \frac{TOD_2 - TOD_1}{TOA_2 - TOA_1} = \frac{(1+\delta_B) \cdot D}{(1+\delta_A) \cdot D} = \frac{1+\delta_B}{1+\delta_A} \qquad \text{Equation 6}$$

Figure 13:
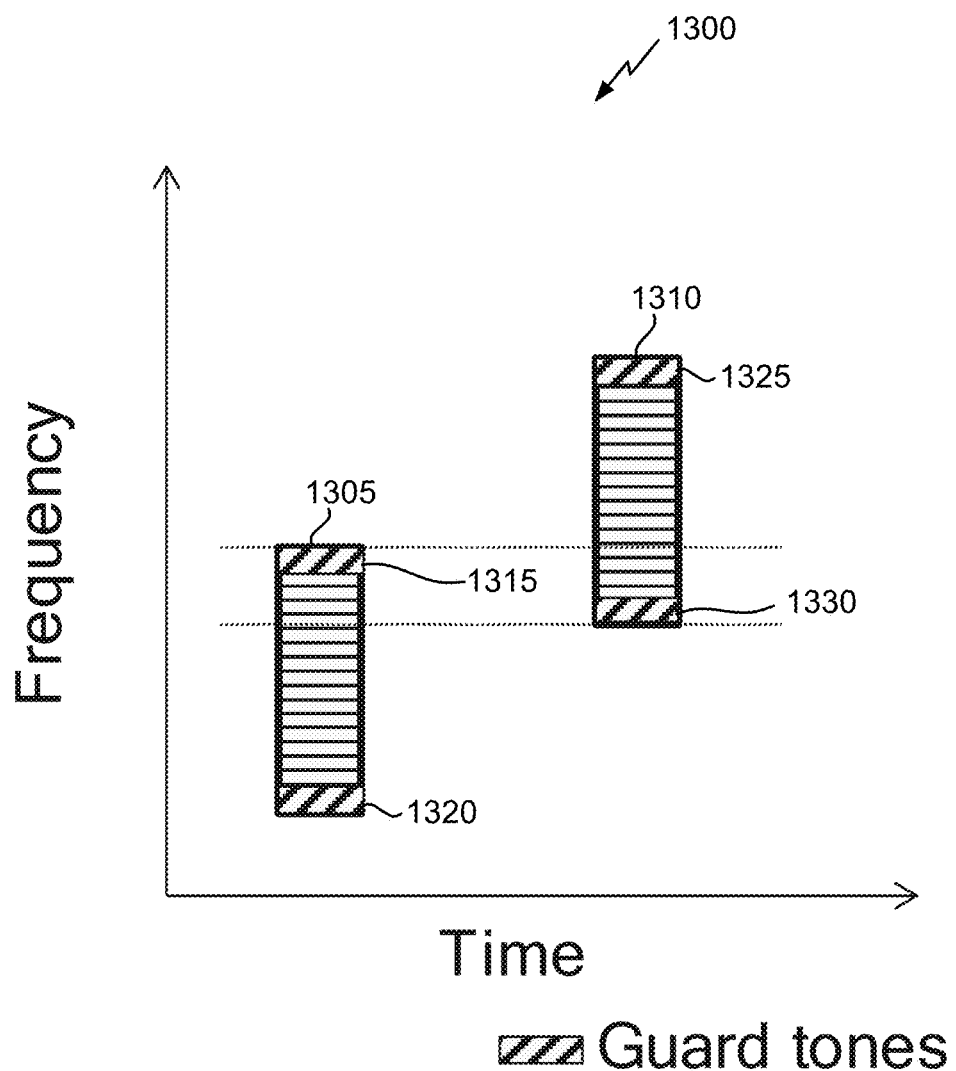
FIG. 13 illustrates a frequency hopping scheme in accordance with another aspect of the disclosure.

FIG. 13 illustrates a frequency hopping scheme 1300 in accordance with another aspect of the disclosure. In FIG. 13, an RS for positioning (e.g., PRS or SRS-P) is processed (e.g., measured or transmitted) at a RedCap UE via a series of M hops. In particular, two of the M hops are illustrated in FIG. 13, with a first frequency hop 1305 followed by a second frequency hop 1310. In FIG. 13, guard tones 1315-1320 are configured among the resources associated with the first frequency hop 1310, and guard tones 1325-1330 are configured among the resources associated with the second frequency hop 1315. In FIG. 13, the frequency-domain resources (or tones) of the first and second frequency hops 1305-1310 overlap in part. Accurate phase offset estimation is possible using overlapping tones with a simple and low complexity algorithm Parameter estimation is harder, but a compressive sensing approach is possible.

Figure 14:
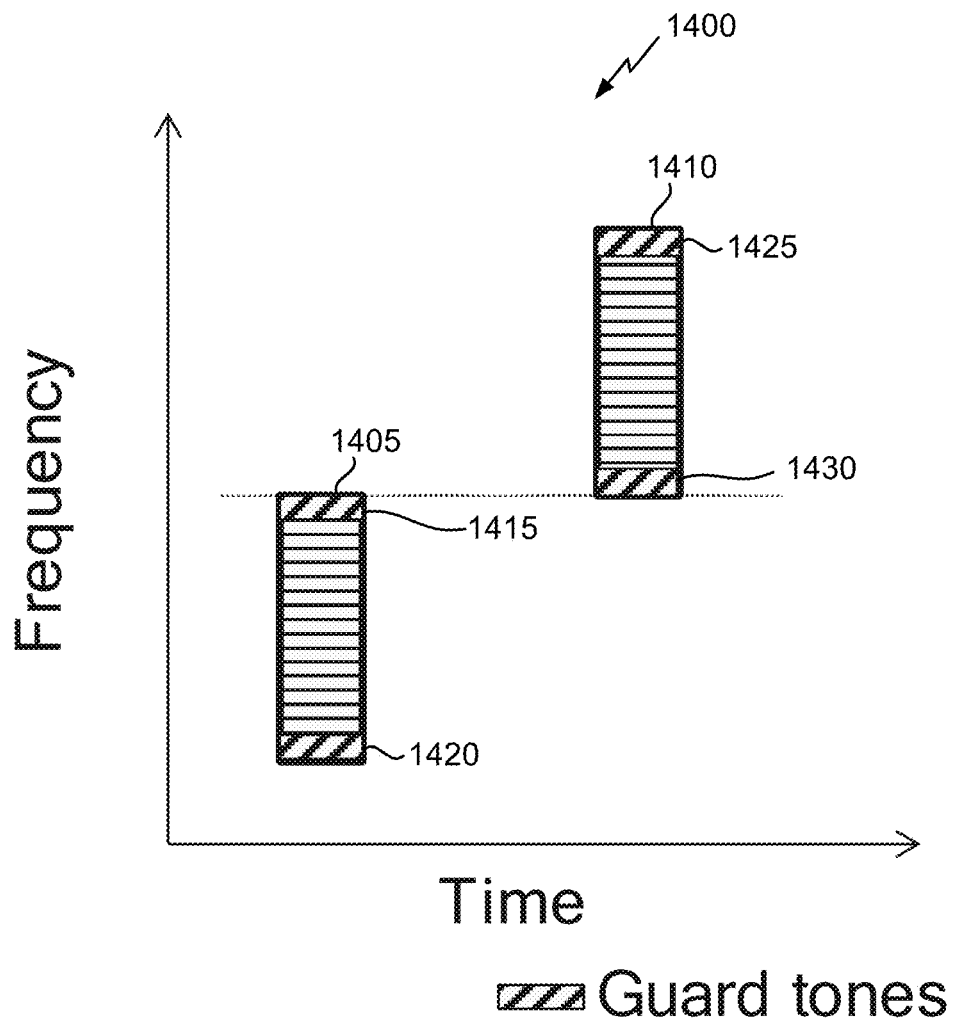
FIG. 14 illustrates a frequency hopping scheme in accordance with another aspect of the disclosure.

FIG. 14 illustrates a frequency hopping scheme 1400 in accordance with another aspect of the disclosure. In FIG. 14, an RS for positioning (e.g., PRS or SRS-P) is processed (e.g., measured or transmitted) at a RedCap UE via a series of M hops. In particular, two of the M hops are illustrated in FIG. 14, with a first frequency hop 1405 followed by a second frequency hop 1410. In FIG. 14, guard tones 1415-1420 are configured among the resources associated with the first frequency hop 1405, and guard tones 1425-1430 are configured among the resources associated with the second frequency hop 1410. In FIG. 14, the frequency-domain resources (or tones) of the first and second frequency hops 1405-1410 are non-overlapping.

Figure 15:
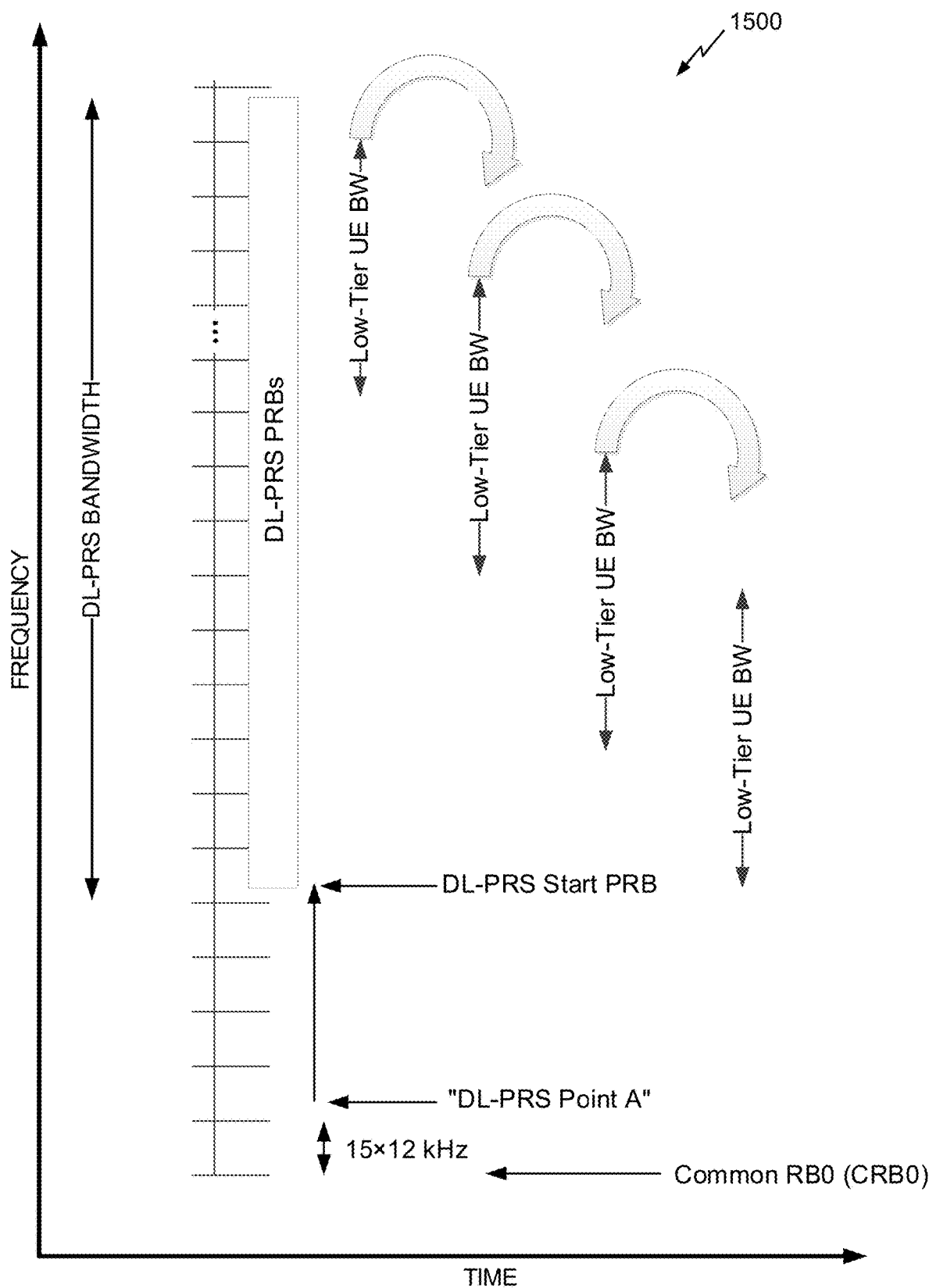
FIG. 15 illustrates a frequency hopping scheme for measuring a DL-PRS bandwidth in accordance with an aspect of the disclosure.

FIG. 15 illustrates a frequency hopping scheme 1500 for measuring a DL-PRS bandwidth in accordance with an aspect of the disclosure. As shown in FIG. 15, at each frequency hop, the UE measures a sub-band that overlaps in part with a sub-band of an adjacent frequency hop. These sub-band measurements can be stitched together to derive a measurement of the entire DL-PRS transmission bandwidth. The DL-PRS is transmitted across a plurality of OFDM symbols, with each frequency hop aligning with one or more of the OFDM symbols of the DL-PRS.

Aspects of the disclosure are directed to determination of a UE capability to measure a DL-PRS across a plurality of frequency hops. Instead of simply assuming that a respective UE can measure an entire DL-PRS transmission bandwidth without frequency hopping, knowledge of the respective UE's frequency hopping capability may facilitate a network component (e.g., base station, LMF, etc.) to configure positioning parameter(s) in a more custom manner. Such aspect may provide various technical advantages, such as more accurate positioning of certain UE types (e.g., RedCap UEs, or any UE that is required to perform frequency hops to measure the full transmission bandwidth of a DL-PRS).

Figure 16:
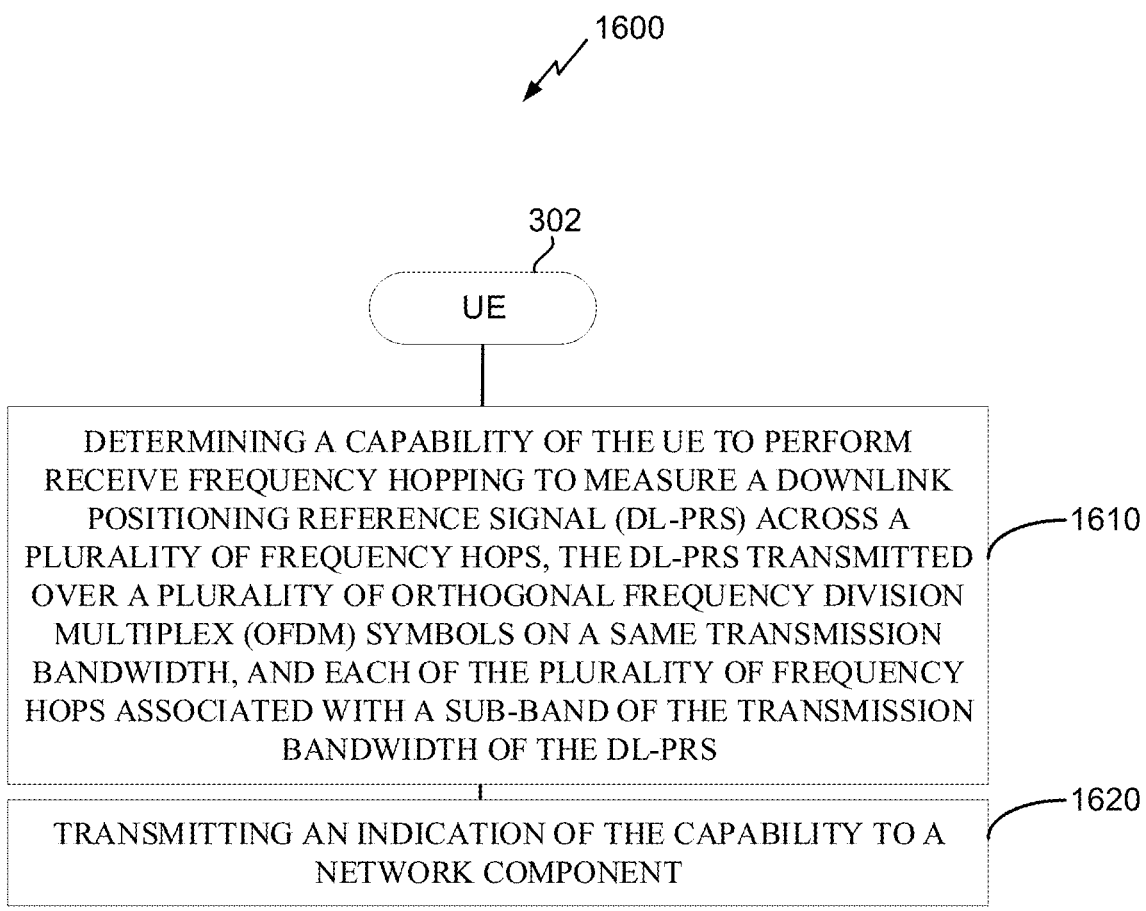
FIG. 16 illustrates an exemplary process of wireless communication, according to aspects of the disclosure.

FIG. 16 illustrates an exemplary process 1600 of wireless communication, according to aspects of the disclosure. In an aspect, the process 1600 may be performed by a UE, such as UE 302.

At 1610, UE 302 (e.g., processing system 334, frequency hopping module 342, etc.) determines a capability of the UE perform receive frequency hopping to to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS. In some designs, the transmission bandwidth (e.g., 100 MHz) of the DL-PRS comprises at least each sub-band (e.g., 20 MHz sub-bands) associated with the plurality of frequency hops. In other words, the sub-band measurements may be stitched together to derive a measurement of the full transmission bandwidth of the DL-PRS. In some designs, the DL-PRS is transmitted on the plurality of OFDM symbols on the same transmission bandwidth without frequency hopping (e.g., as depicted in FIG. 15).

At 1620, UE 302 (e.g., transmitter 312 or 322, etc.) transmits an indication of the capability to a network component (e.g., BS 304, LMF 306, etc.).

Figure 17:
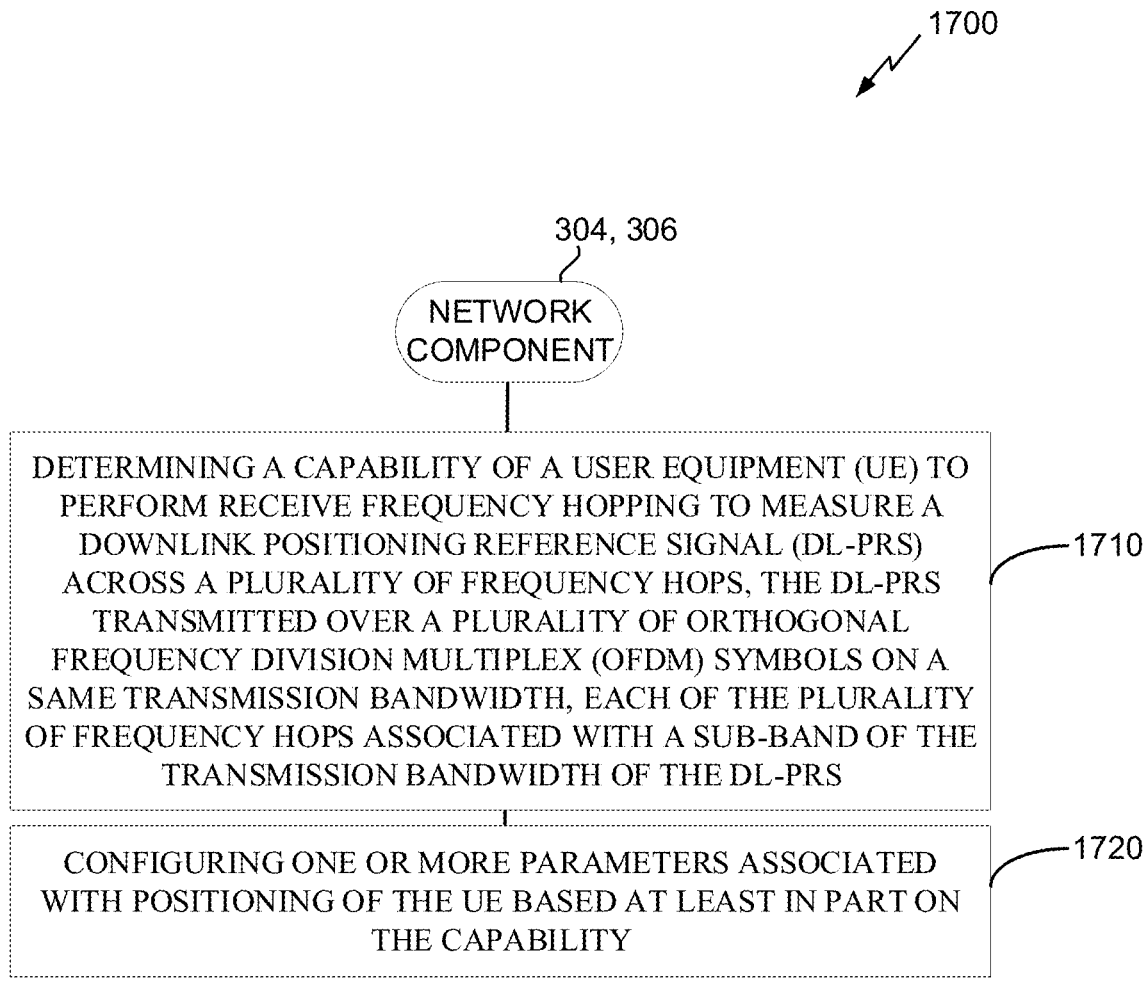
FIG. 17 illustrates an exemplary process of wireless communication, according to aspects of the disclosure.

FIG. 17 illustrates an exemplary process 1700 of wireless communication, according to aspects of the disclosure. In an aspect, the process 1700 may be performed by a network component, such as BS 304 (e.g., in case where LMF is integrated within the RAN) or LMF 306 (e.g., in case where LMF is at external network component, such as core network component or external server).

At 1710, the network component (e.g., data bus 382, network interface(s) 380, receiver 352 or 362, network interface(s) 390, processing system 384 or 394, frequency hopping module 388 or 389, etc.) determines a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS. In some designs, the determination of 1710 may be based on the indication from the UE as described above with respect to 1620 of FIG. 16. In other designs, the determination may be made without such an indication. For example, instead of an explicit UE capability indication from the UE, the network component may determine the UE capability implicitly (e.g., if UE supports frequency hopping at all, then the network component assumes a certain set of minimum or baseline capabilities that do not need to be expressly indicated, etc.). In some designs, the DL-PRS is transmitted on the plurality of OFDM symbols on the same transmission bandwidth without frequency hopping (e.g., as depicted in FIG. 15).

At 1720, the network component (e.g., processing system 384 or 394, frequency hopping module 388 or 389, etc.) configures one or more parameters associated with positioning of the UE based at least in part on the capability. Various examples of the parameter configurations that may be implemented at 1720 will be described below in more detail below.

Referring to FIGS. 16-17, in some designs, a measurement period can be increased from a default measurement period to grant the UE more time to perform the frequency hops. Assume a scenario where a larger number of samples (instances) are needed as compared with a premium UE-type. In one example, if the UE is hopping across instances, to process a bandwidth $B_T$, with a BW in each hop of $B_h$, it would require at least $$\frac{B_T}{B_h}$$

samples. So, if each hop needs to be sampled 4 times, then a total of at least $$4 \cdot \frac{B_T}{B_h}$$

samples may be configured (assuming no overlapped reception). In another example, if the UE is performing overlapped receptions, an overlap factor to include the number of samples may be used. For example, if the overlap is 50%, the UE may require about 2 times more hops, so for the example above, $$2 \cdot 4 \cdot \frac{B_T}{B_h}$$

samples may be configured. If the UE can perform hopping within a single instance, a factor can be introduced which includes the number of hops the UE can do within a single instance, so that the total number of samples is not proportional to the number of hops. For example, in the case above, if the UE can do 2 hops within a single instance, then the samples would be cut in half.

Referring to FIGS. 16-17, in some designs, the capability indicated at 1620 or determined at 1710 may comprise a minimum sub-band overlap between consecutive frequency hops. In some designs, the minimum sub-band overlap is specified as a number of physical resource blocks (PRBs). In other designs, the minimum sub-band overlap is specified as a percentage of a sub-band size associated with the plurality of frequency hops. For example, for a sub-band bandwidth spanning 2 PRBs, the overlap may be specified as 50% (e.g., 1 PRB).

Referring to FIGS. 16-17, in some designs, the capability indicated at 1620 or determined at 1710 may comprise a minimum time gap between consecutive frequency hops.

Referring to FIGS. 16-17, in some designs, the capability indicated at 1620 or determined at 1710 may comprise the UE being capable of performing phase offset compensation (e.g., within a first threshold level of accuracy) with overlapped tones, or the UE being capable of performing phase offset compensation (e.g., within a second threshold level of accuracy) without overlapped tones, or the UE being capable of performing time-offset compensation (e.g., within a third threshold level of accuracy), or a combination thereof. In some designs, the first, second and/or third threshold levels of accuracy may be the same or different.

Referring to FIGS. 16-17, in some designs, the capability indicated at 1620 or determined at 1710 may be per-band or per-band combination. Referring to FIGS. 16-17, in some designs, the capability indicated at 1620 or determined at 1710 may comprise a first number of resources that the UE can process per slot (e.g., additional UE capability may be included, or a separate factor to discount the reported capabilities), or a second number of resources that the UE can process per measurement period (e.g., additional UE capability may be included, or a separate factor to discount the reported capabilities), or a combination thereof. Referring to FIGS. 16-17, in some designs, the capability indicated at 1620 or determined at 1710 may comprise a number of frequency hops that the UE can process over a particular time-domain window.

Referring to FIGS. 16-17, in some designs, one or more accuracy requirements associated with phase-offset compensation, time-drift compensation, or both, are defined assuming a threshold amount of overlap between sub-bands of consecutive frequency hops for a particular time-domain window.

Referring to FIGS. 16-17, in some designs, the one or more parameters may be associated with a DL-PRS configuration for the UE. For example, the one or more parameters may comprise a measurement period associated with the DL-PRS configuration. In a further example, the measurement period is based upon a number of DL-PRS instances associated with the plurality of frequency hops. In a further example, the capability indicated at 1620 or determined at 1710 may comprise a number of the plurality of frequency hops that can be performed within a single DL-PRS instance of the DL-PRS.

In some designs, the DL-PRS configuration is associated with one or more accuracy requirements that are based at least in part on the capability indicated at 1620 or determined at 1710.

Referring to FIGS. 16-17, in some designs, the capability indicated at 1620 or determined at 1710 may comprise a UE DL-PRS processing capability. In an example, the capability indicated at 1620 or determined at 1710 may comprise the UE being capable of processing the DL-PRS as non-overlapped chunks (e.g., $B_h$ MHz each) with non-coherent combining. In another example, the capability indicated at 1620 or determined at 1710 may comprise the UE being capable of processing the DL-PRS as non-overlapped chunks with coherent combining, and with phase-offset compensation, time-drift compensation, or both. In another example, the capability indicated at 1620 or determined at 1710 may comprise the UE being capable of processing the DL-PRS as overlapped chunks (e.g., $B_h$ MHz each, with an overlap factor of R) with coherent combining, and with phase-offset compensation, time-drift compensation, or both. In some designs, one or more accuracy requirements associated with positioning of the UE are determined at the network component based in part upon the UE DL-PRS processing capability. For example, the accuracy requirement determination may be based on whether the UE is determined to be capable of performing the coherent combining.

Referring to FIGS. 16-17, in some designs, the network component may determine one or more accuracy requirements associated with positioning of the UE based in part upon the DL-PRS configuration. For example, the accuracy requirement determination may be based on a duration of PRS resources associated with the DL-PRS configuration, a number of PRS instance repetitions associated with the DL-PRS configuration, or whether PRS instance repetitions occur on consecutive symbols (e.g., back-to-back) or with intervening symbol gaps (e.g., UL symbol gaps), or a combination thereof.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Clause 1. A method of operating a user equipment (UE), comprising: determining a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmitting an indication of the capability to a network component.

Clause 2. The method of clause 1, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 3. The method of any of clauses 1 to 2, wherein the DL-PRS is transmitted on the plurality of OFDM symbols on the same transmission bandwidth without frequency hopping.

Clause 4. The method of any of clauses 1 to 3, wherein the indication indicates a minimum sub-band overlap between two frequency hops.

Clause 5. The method of clause 4, wherein the minimum sub-band overlap is specified as a number of physical resource blocks (PRBs), or wherein the minimum sub-band overlap is specified as a percentage of a sub-band size associated with the plurality of frequency hops.

Clause 6. The method of any of clauses 1 to 5, wherein the indication indicates a minimum time gap between consecutive frequency hops.

Clause 7. The method of any of clauses 1 to 6, wherein the indication indicates that the UE can perform phase offset compensation with overlapped tones, or wherein the indication indicates that the UE can perform phase offset compensation without overlapped tones, or wherein the indication indicates that the UE can perform time-offset compensation, or a combination thereof.

Clause 8. The method of any of clauses 1 to 7, wherein the indication is per-band or per-band combination.

Clause 9. The method of any of clauses 1 to 8, wherein the indication indicates a first number of resources that the UE can process per slot, or wherein the indication indicates a second number of resources that the UE can process per measurement period, or a combination thereof.

Clause 10. The method of any of clauses 1 to 9, wherein the indication indicates a number of frequency hops that the UE can process over a particular time-domain window.

Clause 11. The method of any of clauses 1 to 10, wherein one or more accuracy requirements associated with phase-offset compensation, time-drift compensation, or both, are defined assuming a threshold amount of overlap between sub-bands of consecutive frequency hops for a particular time-domain window.

Clause 12. The method of any of clauses 1 to 11, further comprising: receiving a DL-PRS configuration that is based in part on the indication.

Clause 13. The method of clause 12, wherein a measurement period associated with the DL-PRS configuration is based at least in part upon the indication, or wherein the DL-PRS configuration is associated with one or more accuracy requirements that are based at least in part on the indication, or a combination thereof.

Clause 14. The method of any of clauses 1 to 13, wherein the indication indicates a number of the plurality of frequency hops that can be performed within a single DL-PRS instance of the DL-PRS.

Clause 15. The method of any of clauses 1 to 14, wherein the indication indicates a UE DL-PRS processing capability, or wherein one or more accuracy requirements associated with positioning of the UE are determined based in part upon the UE DL-PRS processing capability, or a combination thereof.

Clause 16. The method of any of clauses 1 to 15, wherein the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

Clause 17. A method of operating a network component, comprising: determining a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configuring one or more parameters associated with positioning of the UE based at least in part on the capability.

Clause 18. The method of clause 17, wherein the determination is based on an indication of the capability from the UE.

Clause 19. The method of any of clauses 17 to 18, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 20. The method of any of clauses 17 to 19, wherein the DL-PRS is transmitted on the plurality of OFDM symbols on the same transmission bandwidth without frequency hopping.

Clause 21. The method of any of clauses 17 to 20, wherein the capability comprises a minimum sub-band overlap between two frequency hops.

Clause 22. The method of clause 21, wherein the minimum sub-band overlap is specified as a number of physical resource blocks (PRBs), or wherein the minimum sub-band overlap is specified as a percentage of a sub-band size associated with the plurality of frequency hops.

Clause 23. The method of any of clauses 17 to 22, wherein the capability comprises that the UE can perform phase offset compensation with overlapped tones, or wherein the capability comprises that the UE can perform phase offset compensation without overlapped tones, or wherein the capability comprises that the UE can perform time-offset compensation, or a combination thereof.

Clause 24. The method of any of clauses 17 to 23, wherein the capability comprises a first number of resources that the UE can process per slot, or wherein the capability comprises a second number of resources that the UE can process per measurement period, or a number of frequency hops that the UE can process over a particular time-domain window, or a combination thereof.

Clause 25. The method of any of clauses 17 to 24, wherein the one or more parameters comprise at least one parameter associated with a DL-PRS configuration, or wherein the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

Clause 26. The method of clause 25, further comprising: determining one or more accuracy requirements associated with positioning of the UE based in part upon the DL-PRS configuration.

Clause 27. The method of any of clauses 17 to 26, wherein the capability comprises a UE DL-PRS processing capability.

Clause 28. The method of any of clauses 17 to 27, wherein one or more accuracy requirements associated with phase-offset compensation, time-drift compensation, or both, are defined assuming a threshold amount of overlap between sub-bands of consecutive frequency hops for a particular time-domain window.

Clause 29. A user equipment (UE), comprising: a memory; at least one transceiver; and at least one processor communicatively coupled to the memory and the at least one transceiver, the at least one processor configured to: determine a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmit, via the at least one transceiver, an indication of the capability to a network component.

Clause 30. The UE of clause 29, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 31. The UE of any of clauses 29 to 30, wherein the DL-PRS is transmitted on the plurality of OFDM symbols on the same transmission bandwidth without frequency hopping.

Clause 32. The UE of any of clauses 29 to 31, wherein the indication indicates a minimum sub-band overlap between two frequency hops.

Clause 33. The UE of clause 32, wherein the minimum sub-band overlap is specified as a number of physical resource blocks (PRBs), or wherein the minimum sub-band overlap is specified as a percentage of a sub-band size associated with the plurality of frequency hops.

Clause 34. The UE of any of clauses 29 to 33, wherein the indication indicates a minimum time gap between consecutive frequency hops.

Clause 35. The UE of any of clauses 29 to 34, wherein the indication indicates that the UE can perform phase offset compensation with overlapped tones, or wherein the indication indicates that the UE can perform phase offset compensation without overlapped tones, or wherein the indication indicates that the UE can perform time-offset compensation, or a combination thereof.

Clause 36. The UE of any of clauses 29 to 35, wherein the indication is per-band or per-band combination.

Clause 37. The UE of any of clauses 29 to 36, wherein the indication indicates a first number of resources that the UE can process per slot, or wherein the indication indicates a second number of resources that the UE can process per measurement period, or a combination thereof.

Clause 38. The UE of any of clauses 29 to 37, wherein the indication indicates a number of frequency hops that the UE can process over a particular time-domain window.

Clause 39. The UE of any of clauses 29 to 38, wherein one or more accuracy requirements associated with phase-offset compensation, time-drift compensation, or both, are defined assuming a threshold amount of overlap between sub-bands of consecutive frequency hops for a particular time-domain window.

Clause 40. The UE of any of clauses 29 to 39, wherein the at least one processor is further configured to: receive, via the at least one transceiver, a DL-PRS configuration that is based in part on the indication.

Clause 41. The UE of clause 40, wherein a measurement period associated with the DL-PRS configuration is based at least in part upon the indication, or wherein the DL-PRS configuration is associated with one or more accuracy requirements that are based at least in part on the indication, or a combination thereof.

Clause 42. The UE of any of clauses 29 to 41, wherein the indication indicates a number of the plurality of frequency hops that can be performed within a single DL-PRS instance of the DL-PRS.

Clause 43. The UE of any of clauses 29 to 42, wherein the indication indicates a UE DL-PRS processing capability, or wherein one or more accuracy requirements associated with positioning of the UE are determined based in part upon the UE DL-PRS processing capability, or a combination thereof.

Clause 44. The UE of any of clauses 29 to 43, wherein the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

Clause 45. A network component, comprising: a memory; at least one transceiver; and at least one processor communicatively coupled to the memory and the at least one transceiver, the at least one processor configured to: determine a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configure one or more parameters associated with positioning of the UE based at least in part on the capability.

Clause 46. The network component of clause 45, wherein the determination is based on an indication of the capability from the UE.

Clause 47. The network component of any of clauses 45 to 46, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 48. The network component of any of clauses 45 to 47, wherein the DL-PRS is transmitted on the plurality of OFDM symbols on the same transmission bandwidth without frequency hopping.

Clause 49. The network component of any of clauses 45 to 48, wherein the capability comprises a minimum sub-band overlap between two frequency hops.

Clause 50. The network component of clause 49, wherein the minimum sub-band overlap is specified as a number of physical resource blocks (PRBs), or wherein the minimum sub-band overlap is specified as a percentage of a sub-band size associated with the plurality of frequency hops.

Clause 51. The network component of any of clauses 45 to 50, wherein the capability comprises that the UE can perform phase offset compensation with overlapped tones, or wherein the capability comprises that the UE can perform phase offset compensation without overlapped tones, or wherein the capability comprises that the UE can perform time-offset compensation, or a combination thereof.

Clause 52. The network component of any of clauses 45 to 51, wherein the capability comprises a first number of resources that the UE can process per slot, or wherein the capability comprises a second number of resources that the UE can process per measurement period, or a number of frequency hops that the UE can process over a particular time-domain window, or a combination thereof.

Clause 53. The network component of any of clauses 45 to 52, wherein the one or more parameters comprise at least one parameter associated with a DL-PRS configuration, or wherein the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

Clause 54. The network component of clause 53, wherein the at least one processor is further configured to: determine one or more accuracy requirements associated with positioning of the UE based in part upon the DL-PRS configuration.

Clause 55. The network component of any of clauses 45 to 54, wherein the capability comprises a UE DL-PRS processing capability.

Clause 56. The network component of any of clauses 45 to 55, wherein one or more accuracy requirements associated with phase-offset compensation, time-drift compensation, or both, are defined assuming a threshold amount of overlap between sub-bands of consecutive frequency hops for a particular time-domain window.

Clause 57. A user equipment (UE), comprising: means for determining a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and means for transmitting an indication of the capability to a network component.

Clause 58. The UE of clause 57, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 59. The UE of any of clauses 57 to 58, wherein the DL-PRS is transmitted on the plurality of OFDM symbols on the same transmission bandwidth without frequency hopping.

Clause 60. The UE of any of clauses 57 to 59, wherein the indication indicates a minimum sub-band overlap between two frequency hops.

Clause 61. The UE of clause 60, wherein the minimum sub-band overlap is specified as a number of physical resource blocks (PRBs), or wherein the minimum sub-band overlap is specified as a percentage of a sub-band size associated with the plurality of frequency hops.

Clause 62. The UE of any of clauses 57 to 61, wherein the indication indicates a minimum time gap between consecutive frequency hops.

Clause 63. The UE of any of clauses 57 to 62, wherein the indication indicates that the UE can perform phase offset compensation with overlapped tones, or wherein the indication indicates that the UE can perform phase offset compensation without overlapped tones, or wherein the indication indicates that the UE can perform time-offset compensation, or a combination thereof.

Clause 64. The UE of any of clauses 57 to 63, wherein the indication is per-band or per-band combination.

Clause 65. The UE of any of clauses 57 to 64, wherein the indication indicates a first number of resources that the UE can process per slot, or wherein the indication indicates a second number of resources that the UE can process per measurement period, or a combination thereof.

Clause 66. The UE of any of clauses 57 to 65, wherein the indication indicates a number of frequency hops that the UE can process over a particular time-domain window.

Clause 67. The UE of any of clauses 57 to 66, wherein one or more accuracy requirements associated with phase-offset compensation, time-drift compensation, or both, are defined assuming a threshold amount of overlap between sub-bands of consecutive frequency hops for a particular time-domain window.

Clause 68. The UE of any of clauses 57 to 67, further comprising: means for receiving a DL-PRS configuration that is based in part on the indication.

Clause 69. The UE of clause 68, wherein a measurement period associated with the DL-PRS configuration is based at least in part upon the indication, or wherein the DL-PRS configuration is associated with one or more accuracy requirements that are based at least in part on the indication, or a combination thereof.

Clause 70. The UE of any of clauses 57 to 69, wherein the indication indicates a number of the plurality of frequency hops that can be performed within a single DL-PRS instance of the DL-PRS.

Clause 71. The UE of any of clauses 57 to 70, wherein the indication indicates a UE DL-PRS processing capability. or wherein one or more accuracy requirements associated with positioning of the UE are determined based in part upon the UE DL-PRS processing capability, or a combination thereof.

Clause 72. The UE of any of clauses 57 to 71, wherein the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

Clause 73. A network component, comprising: means for determining a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and means for configuring one or more parameters associated with positioning of the UE based at least in part on the capability.

Clause 74. The network component of clause 73, wherein the determination is based on an indication of the capability from the UE.

Clause 75. The network component of any of clauses 73 to 74, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 76. The network component of any of clauses 73 to 75, wherein the DL-PRS is transmitted on the plurality of OFDM symbols on the same transmission bandwidth without frequency hopping.

Clause 77. The network component of any of clauses 73 to 76, wherein the capability comprises a minimum sub-band overlap between two frequency hops.

Clause 78. The network component of clause 77, wherein the minimum sub-band overlap is specified as a number of physical resource blocks (PRBs), or wherein the minimum sub-band overlap is specified as a percentage of a sub-band size associated with the plurality of frequency hops.

Clause 79. The network component of any of clauses 73 to 78, wherein the capability comprises that the UE can perform phase offset compensation with overlapped tones, or wherein the capability comprises that the UE can perform phase offset compensation without overlapped tones, or wherein the capability comprises that the UE can perform time-offset compensation, or a combination thereof.

Clause 80. The network component of any of clauses 73 to 79, wherein the capability comprises a first number of resources that the UE can process per slot, or wherein the capability comprises a second number of resources that the UE can process per measurement period, or a number of frequency hops that the UE can process over a particular time-domain window, or a combination thereof.

Clause 81. The network component of any of clauses 73 to 80, wherein the one or more parameters comprise at least one parameter associated with a DL-PRS configuration, or wherein the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

Clause 82. The network component of clause 81, further comprising: means for determining one or more accuracy requirements associated with positioning of the UE based in part upon the DL-PRS configuration.

Clause 83. The network component of any of clauses 73 to 82, wherein the capability comprises a UE DL-PRS processing capability.

Clause 84. The network component of any of clauses 73 to 83, wherein one or more accuracy requirements associated with phase-offset compensation, time-drift compensation, or both, are defined assuming a threshold amount of overlap between sub-bands of consecutive frequency hops for a particular time-domain window.

Clause 85. A non-transitory computer-readable medium storing computer-executable instructions that, when executed by a user equipment (UE), cause the UE to: determine a capability of the UE to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, and each of the plurality of frequency hops associated with a sub-band of the transmission bandwidth of the DL-PRS; and transmit an indication of the capability to a network component.

Clause 86. The non-transitory computer-readable medium of clause 85, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 87. The non-transitory computer-readable medium of any of clauses 85 to 86, wherein the DL-PRS is transmitted on the plurality of OFDM symbols on the same transmission bandwidth without frequency hopping.

Clause 88. The non-transitory computer-readable medium of any of clauses 85 to 87, wherein the indication indicates a minimum sub-band overlap between two frequency hops.

Clause 89. The non-transitory computer-readable medium of clause 88, wherein the minimum sub-band overlap is specified as a number of physical resource blocks (PRBs), or wherein the minimum sub-band overlap is specified as a percentage of a sub-band size associated with the plurality of frequency hops.

Clause 90. The non-transitory computer-readable medium of any of clauses 85 to 89, wherein the indication indicates a minimum time gap between consecutive frequency hops.

Clause 91. The non-transitory computer-readable medium of any of clauses 85 to 90, wherein the indication indicates that the UE can perform phase offset compensation with overlapped tones, or wherein the indication indicates that the UE can perform phase offset compensation without overlapped tones, or wherein the indication indicates that the UE can perform time-offset compensation, or a combination thereof.

Clause 92. The non-transitory computer-readable medium of any of clauses 85 to 91, wherein the indication is per-band or per-band combination.

Clause 93. The non-transitory computer-readable medium of any of clauses 85 to 92, wherein the indication indicates a first number of resources that the UE can process per slot, or wherein the indication indicates a second number of resources that the UE can process per measurement period, or a combination thereof.

Clause 94. The non-transitory computer-readable medium of any of clauses 85 to 93, wherein the indication indicates a number of frequency hops that the UE can process over a particular time-domain window.

Clause 95. The non-transitory computer-readable medium of any of clauses 85 to 94, wherein one or more accuracy requirements associated with phase-offset compensation, time-drift compensation, or both, are defined assuming a threshold amount of overlap between sub-bands of consecutive frequency hops for a particular time-domain window.

Clause 96. The non-transitory computer-readable medium of any of clauses 85 to 95, further comprising instructions that, when executed by UE, further cause the UE to: receive a DL-PRS configuration that is based in part on the indication.

Clause 97. The non-transitory computer-readable medium of clause 96, wherein a measurement period associated with the DL-PRS configuration is based at least in part upon the indication, or wherein the DL-PRS configuration is associated with one or more accuracy requirements that are based at least in part on the indication, or a combination thereof.

Clause 98. The non-transitory computer-readable medium of any of clauses 85 to 97, wherein the indication indicates a number of the plurality of frequency hops that can be performed within a single DL-PRS instance of the DL-PRS.

Clause 99. The non-transitory computer-readable medium of any of clauses 85 to 98, wherein the indication indicates a UE DL-PRS processing capability. or wherein one or more accuracy requirements associated with positioning of the UE are determined based in part upon the UE DL-PRS processing capability, or a combination thereof.

Clause 100. The non-transitory computer-readable medium of any of clauses 85 to 99, wherein the indication indicates that: the UE is capable of processing the DL-PRS as non-overlapped sub-bands with non-coherent combining, or the UE is capable of processing the DL-PRS as non-overlapped sub-bands with coherent combining, and with phase-offset compensation, time-drift compensation, or both, or the UE is capable of processing the DL-PRS as overlapped sub-bands with coherent combining, and with phase-offset compensation, time-drift compensation, or both.

Clause 101. A non-transitory computer-readable medium storing computer-executable instructions that, when executed by a network component, cause the network component to: determine a capability of a user equipment (UE) to perform receive frequency hopping to measure a downlink positioning reference signal (DL-PRS) across a plurality of frequency hops, the DL-PRS transmitted over a plurality of orthogonal frequency division multiplex (OFDM) symbols on a same transmission bandwidth, each of the plurality of frequency hops associated with a sub-band of the transmission bandwidth of the DL-PRS; and configure one or more parameters associated with positioning of the UE based at least in part on the capability.

Clause 102. The non-transitory computer-readable medium of clause 101, wherein the determination is based on an indication of the capability from the UE.

Clause 103. The non-transitory computer-readable medium of any of clauses 101 to 102, wherein the transmission bandwidth of the DL-PRS comprises at least each sub-band associated with the plurality of frequency hops, and wherein each of the plurality of frequency hops is associated with measurement by the UE of the respective sub-band at a different time.

Clause 104. The non-transitory computer-readable medium of any of clauses 101 to 103, wherein the DL-PRS is transmitted on the plurality of OFDM symbols on the same transmission bandwidth without frequency hopping.

Clause 105. The non-transitory computer-readable medium of any of clauses 101 to 104, wherein the capability comprises a minimum sub-band overlap between two frequency hops.

Clause 106. The non-transitory computer-readable medium of clause 105, wherein the minimum sub-band overlap is specified as a number of physical resource blocks (PRBs), or wherein the minimum sub-band overlap is specified as a percentage of a sub-band size associated with the plurality of frequency hops.

Clause 107. The non-transitory computer-readable medium of any of clauses 101 to 106, wherein the capability comprises that the UE can perform phase offset compensation with overlapped tones, or wherein the capability comprises that the UE can perform phase offset compensation without overlapped tones, or wherein the capability comprises that the UE can perform time-offset compensation, or a combination thereof.

Clause 108. The non-transitory computer-readable medium of any of clauses 101 to 107, wherein the capability comprises a first number of resources that the UE can process per slot, or wherein the capability comprises a second number of resources that the UE can process per measurement period, or a number of frequency hops that the UE can process over a particular time-domain window, or a combination thereof.

Clause 109. The non-transitory computer-readable medium of any of clauses 101 to 108, wherein the one or more parameters comprise at least one parameter associated with a DL-PRS configuration, or wherein the at least one parameter comprises a measurement period associated with the DL-PRS configuration, or wherein the measurement period is based upon a number of DL-PRS instances associated with the plurality of frequency hops, or wherein the capability comprises a number of the plurality of frequency hops that can be performed within a single DL-PRS instance of the DL-PRS, or a combination thereof.

Clause 110. The non-transitory computer-readable medium of clause 109, further comprising instructions that, when executed by network component, further cause the network component to: determine one or more accuracy requirements associated with positioning of the UE based in part upon the DL-PRS configuration.

Clause 111. The non-transitory computer-readable medium of any of clauses 101 to 110, wherein the capability comprises a UE DL-PRS processing capability.

Clause 112. The non-transitory computer-readable medium of any of clauses 101 to 111, wherein one or more accuracy requirements associated with phase-offset compensation, time-drift compensation, or both, are defined assuming a threshold amount of overlap between sub-bands of consecutive frequency hops for a particular time-domain window.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   determining a capability of the UE to perform a measurement of a downlink positioning reference signal (DL-PRS) across a plurality of measurement instances, the DL-PRS transmitted over a plurality of orthogonal frequency division multiplex (OFDM) symbols on a same transmission bandwidth, and each of the plurality of measurement instances associated with a different sub-band of the transmission bandwidth of the DL-PRS; and
   transmitting an indication of the capability to a network component,
   wherein the DL-PRS is transmitted on the plurality of OFDM symbols on the same transmission bandwidth without transmit frequency hopping, wherein the same transmission bandwidth represents a full transmission bandwidth of the DL-PRS,
   wherein the indication indicates a minimum sub-band overlap between adjacent measurement instances that can be performed within a single DL-PRS instance of the DL-PRS,
   wherein the full transmission bandwidth of the DL-PRS includes at least each sub-band associated with the plurality of measurement instances, and each of the plurality of measurement instances is associated with a measurement by the UE of the respective sub-band at a different time, wherein measurements by the UE of the respective sub-bands are combined to derive a measurement of the full transmission bandwidth of the DL-PRS.

2. The method of claim 1,
   wherein the full transmission bandwidth of the DL-PRS is maintained during measurements by the UE of the respective sub-bands.

3. The method of claim 1,
   wherein the minimum sub-band overlap is specified as a number of physical resource blocks (PRBs), or
   wherein the minimum sub-band overlap is specified as a percentage of a sub-band size associated with the plurality of measurement instances.

4. The method of claim 1, wherein the indication indicates a minimum time gap between consecutive measurement instances.

5. The method of claim 1,
   wherein the indication indicates that the UE can perform phase offset compensation with overlapped tones, or
   wherein the indication indicates that the UE can perform phase offset compensation without overlapped tones, or
   wherein the indication indicates that the UE can perform time-offset compensation, or
   a combination thereof.

6. The method of claim 1, wherein the indication is per-band or per-band combination.

7. The method of claim 1,
   wherein the indication indicates a first number of resources that the UE can process per slot, or
   wherein the indication indicates a second number of resources that the UE can process per measurement period, or
   a combination thereof.

8. The method of claim 1, wherein the indication indicates a number of measurement instances that the UE can process over a particular time-domain window.

9. The method of claim 1, wherein one or more accuracy requirements associated with phase-offset compensation, time-drift compensation, or both, are defined assuming a threshold amount of overlap between sub-bands of consecutive measurement instances for a particular time-domain window.

10. The method of claim 1, further comprising:
    receiving a DL-PRS configuration that is based in part on the indication.

11. The method of claim 10,
    wherein a measurement period associated with the DL-PRS configuration is based at least in part upon the indication, or
    wherein the DL-PRS configuration is associated with one or more accuracy requirements that are based at least in part on the indication, or
    a combination thereof.

12. The method of claim 1,
    wherein the indication indicates a UE DL-PRS processing capability, or
    wherein one or more accuracy requirements associated with positioning of the UE are determined based in part upon the UE DL-PRS processing capability, or
    a combination thereof.

13. The method of claim 1, wherein the indication indicates that:
    the UE is capable of processing the DL-PRS as non-overlapped sub-bands with non-coherent combining, or
    the UE is capable of processing the DL-PRS as non-overlapped sub-bands with coherent combining, and with phase-offset compensation, time-drift compensation, or both, or
    the UE is capable of processing the DL-PRS as overlapped sub-bands with coherent combining, and with phase-offset compensation, time-drift compensation, or both.

14. A method of operating a network component, comprising:
    determining a capability of a user equipment (UE) to perform a measurement of a downlink positioning reference signal (DL-PRS) across a plurality of measurement instances, the DL-PRS transmitted over a plurality of orthogonal frequency division multiplex (OFDM) symbols on a same transmission bandwidth, each of the plurality of measurement instances associated with a different sub-band of the transmission bandwidth of the DL-PRS; and
configuring one or more parameters associated with positioning of the UE based at least in part on the capability,
wherein the DL-PRS is transmitted on the plurality of OFDM symbols on the same transmission bandwidth without transmit frequency hopping, wherein the same transmission bandwidth represents a full transmission bandwidth of the DL-PRS, and
wherein the indication indicates a minimum sub-band overlap between adjacent measurement instances that can be performed within a single DL-PRS instance of the DL-PRS,
wherein the full transmission bandwidth of the DL-PRS includes at least each sub-band associated with the plurality of measurement instances, and each of the plurality of measurement instances is associated with a measurement by the UE of the respective sub-band at a different time, wherein measurements by the UE of the respective sub-bands are combined to derive a measurement of the full transmission bandwidth of the DL-PRS.

15. The method of claim 14, wherein the determination is based on an indication of the capability from the UE.

16. The method of claim 14,
wherein the full transmission bandwidth of the DL-PRS is maintained during measurements by the UE of the respective sub-bands.

17. The method of claim 14,
wherein the minimum sub-band overlap is specified as a number of physical resource blocks (PRBs), or
wherein the minimum sub-band overlap is specified as a percentage of a sub-band size associated with the plurality of measurement instances.

18. The method of claim 14,
wherein the capability comprises that the UE can perform phase offset compensation with overlapped tones, or
wherein the capability comprises that the UE can perform phase offset compensation without overlapped tones, or
wherein the capability comprises that the UE can perform time-offset compensation, or
a combination thereof.

19. The method of claim 14,
wherein the capability comprises a first number of resources that the UE can process per slot, or
wherein the capability comprises a second number of resources that the UE can process per measurement period, or
a number of measurement instances that the UE can process over a particular time-domain window, or
a combination thereof.

20. The method of claim 14,
wherein the one or more parameters comprise at least one parameter associated with a DL-PRS configuration, or
wherein the at least one parameter comprises a measurement period associated with the DL-PRS configuration, or
wherein the measurement period is based upon a number of DL-PRS instances associated with the plurality of measurement instances, or
wherein the capability comprises a number of the plurality of measurement instances that can be performed within a single DL-PRS instance of the DL-PRS, or a combination thereof.

21. The method of claim 20, further comprising:
determining one or more accuracy requirements associated with positioning of the UE based in part upon the DL-PRS configuration.

22. The method of claim 14, wherein the capability comprises a UE DL-PRS processing capability.

23. The method of claim 14, wherein one or more accuracy requirements associated with phase-offset compensation, time-drift compensation, or both, are defined assuming a threshold amount of overlap between sub-bands of consecutive measurement instances for a particular time-domain window.

24. A user equipment (UE), comprising:
a memory;
at least one transceiver; and
at least one processor communicatively coupled to the memory and the at least one transceiver, the at least one processor configured to:
determine a capability of the UE to perform a measurement of a downlink positioning reference signal (DL-PRS) across a plurality of measurement instances, the DL-PRS transmitted over a plurality of orthogonal frequency division multiplex (OFDM) symbols on a same transmission bandwidth, and each of the plurality of measurement instances associated with a different sub-band of the transmission bandwidth of the DL-PRS; and
transmit, via the at least one transceiver, an indication of the capability to a network component,
wherein the DL-PRS is transmitted on the plurality of OFDM symbols on the same transmission bandwidth without transmit frequency hopping, wherein the same transmission bandwidth represents a full transmission bandwidth of the DL-PRS, and
wherein the indication indicates a minimum sub-band overlap between adjacent measurement instances that can be performed within a single DL-PRS instance of the DL-PRS,
wherein the full transmission bandwidth of the DL-PRS includes at least each sub-band associated with the plurality of measurement instances, and each of the plurality of measurement instances is associated with a measurement by the UE of the respective sub-band at a different time, wherein measurements by the UE of the respective sub-bands are combined to derive a measurement of the full transmission bandwidth of the DL-PRS.

25. A network component, comprising:
a memory;
at least one transceiver; and
at least one processor communicatively coupled to the memory and the at least one transceiver, the at least one processor configured to:
determine a capability of a user equipment (UE) to perform a measurement of a downlink positioning reference signal (DL-PRS) across a plurality of measurement instances, the DL-PRS transmitted over a plurality of orthogonal frequency division multiplex (OFDM) symbols on a same transmission bandwidth, each of the plurality of measurement instances associated with a sub-band of the transmission bandwidth of the DL-PRS; and
configure one or more parameters associated with positioning of the UE based at least in part on the capability,
wherein the DL-PRS is transmitted on the plurality of OFDM symbols on the same transmission bandwidth without transmit frequency hopping, wherein the same transmission bandwidth represents a full transmission bandwidth of the DL-PRS, and wherein the indication indicates a minimum sub-band overlap between adjacent measurement instances that can be performed within a single DL-PRS instance of the DL-PRS, wherein the full transmission bandwidth of the DL-PRS includes at least each sub-band associated with the plurality of measurement instances, and each of the plurality of measurement instances is associated with a measurement by the UE of the respective sub-band at a different time, wherein measurements by the UE of the respective sub-bands are combined to derive a measurement of the full transmission bandwidth of the DL-PRS.

26. A method of operating a user equipment (UE), comprising:

determining a capability of the UE to perform a measurement of a downlink positioning reference signal (DL-PRS) across a plurality of measurement instances, the DL-PRS transmitted over a plurality of orthogonal frequency division multiplex (OFDM) symbols on a full transmission bandwidth of the DL-PRS, and each of the plurality of measurement instances associated with a sub-band of the full transmission bandwidth of the DL-PRS; and transmitting an indication of the capability to a network component, wherein the DL-PRS is transmitted on the plurality of OFDM symbols on the full transmission bandwidth without transmit frequency hopping, wherein the indication indicates a minimum sub-band overlap between two consecutive measurement instances that can be performed within a single DL-PRS instance of the DL-PRS, and further wherein the full transmission bandwidth of the DL-PRS is maintained during the determining the capability of the UE.

27. The method of claim 26, wherein the full transmission bandwidth of the DL-PRS includes at least each sub-band associated with the plurality of measurement instances, and each of the plurality of measurement instances is associated with a measurement by the UE of the respective sub-band at a different time and measurements by the UE of the respective sub-bands are combined to derive a measurement of the full transmission bandwidth of the DL-PRS.

28. The method of claim 26, wherein the minimum sub-band overlap is specified as a number of physical resource blocks (PRBs), or wherein the minimum sub-band overlap is specified as a percentage of a sub-band size associated with the plurality of measurement instances.

29. The method of claim 26, wherein the indication indicates that the UE can perform phase offset compensation with overlapped tones, or wherein the indication indicates that the UE can perform phase offset compensation without overlapped tones, or wherein the indication indicates that the UE can perform time-offset compensation, or a combination thereof.

\* \* \* \* \*